United States Patent [19]

Sakamoto

[11] Patent Number: 4,549,234
[45] Date of Patent: Oct. 22, 1985

[54] METHOD AND APPARATUS FOR TRACKING CONTROL

[75] Inventor: Hitoshi Sakamoto, Zama, Japan

[73] Assignee: Sony Corporation, Tokyo, Japan

[21] Appl. No.: 351,429

[22] Filed: Feb. 23, 1982

[30] Foreign Application Priority Data

Feb. 4, 1981 [JP] Japan ................... 56-25931

[51] Int. Cl.⁴ ........................... G11B 21/00
[52] U.S. Cl. ..................... 360/10.2; 360/77
[58] Field of Search ............. 360/10.1–10.3, 360/70, 73, 14.1–14.2, 72.2, 74.4, 77–78, DIG. 1

[56] References Cited

U.S. PATENT DOCUMENTS

| | | | |
|---|---|---|---|
| 3,943,562 | 3/1976 | Opelt | 360/10.3 |
| 4,139,872 | 2/1979 | Tachi | 360/10.3 |
| 4,161,001 | 7/1979 | Sakamoto | 360/10.3 |
| 4,163,993 | 8/1979 | Ravizza et al. | 360/10 |
| 4,190,869 | 2/1980 | Ota | 360/10.2 |
| 4,241,365 | 12/1980 | Koda et al. | 360/10.2 |
| 4,255,768 | 3/1981 | Kubota | 360/10.2 |
| 4,276,571 | 6/1981 | Sakamoto | 360/10.2 |
| 4,296,443 | 10/1981 | Sakamoto et al. | 360/10 |

FOREIGN PATENT DOCUMENTS 2241843  3/1975  France.
2416524  8/1979  France.
2017352 10/1979  United Kingdom.

OTHER PUBLICATIONS

Japan, Patent Abstracts, vol. 6, No. 2, Jan. 8, 1982, Patent No. 56-127926.

Primary Examiner—Robert L. Richardson
Attorney, Agent, or Firm—Lewis H. Eslinger; Alvin Sinderbrand

[57] ABSTRACT

A method and apparatus for controlling the movement of a record medium, such as a tape, having skewed record tracks which are scanned by a transducer, such as a playback head. The record medium is commanded to be transported at a speed and for a distance which may be arbitrarily variable. While the record medium is moved, successive record tracks are scanned by the transducer; and the phase difference between the scanned track and the scanning trace of the transducer is detected. The speed at which the record medium is transported is derived from the command; and this speed is adjusted as a function of the detected phase difference.

32 Claims, 23 Drawing Figures

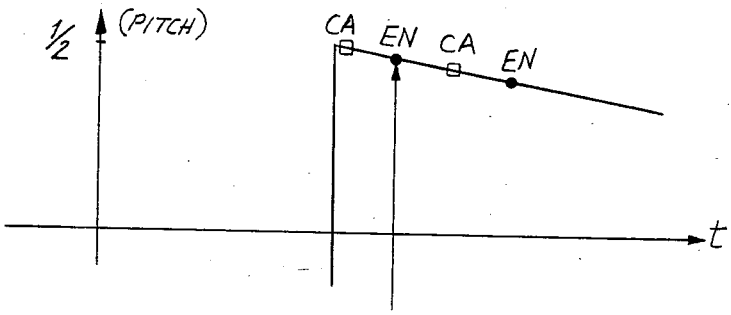
FIG.7A
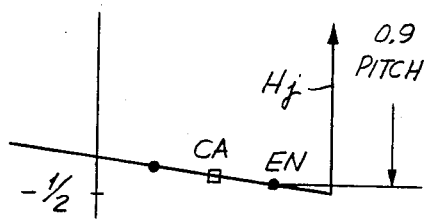
FIG.7B
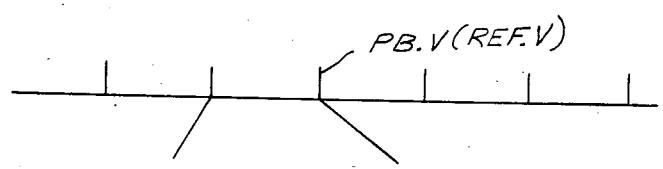
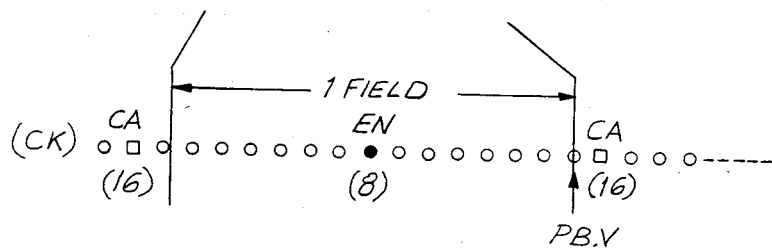
FIG.7C
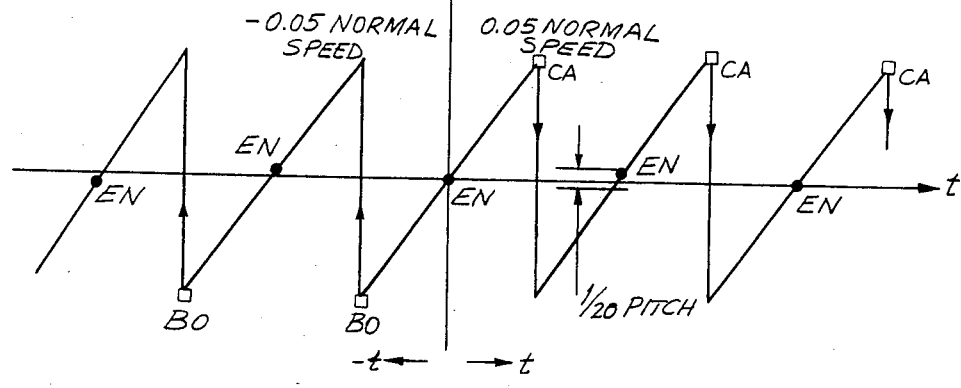
FIG.8

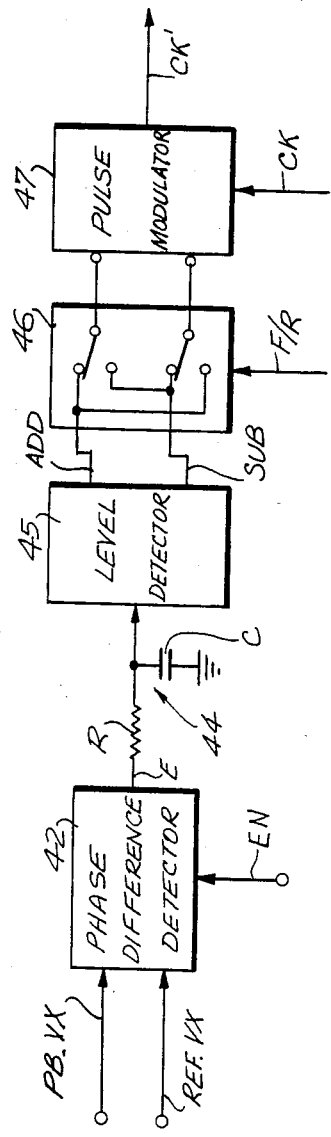
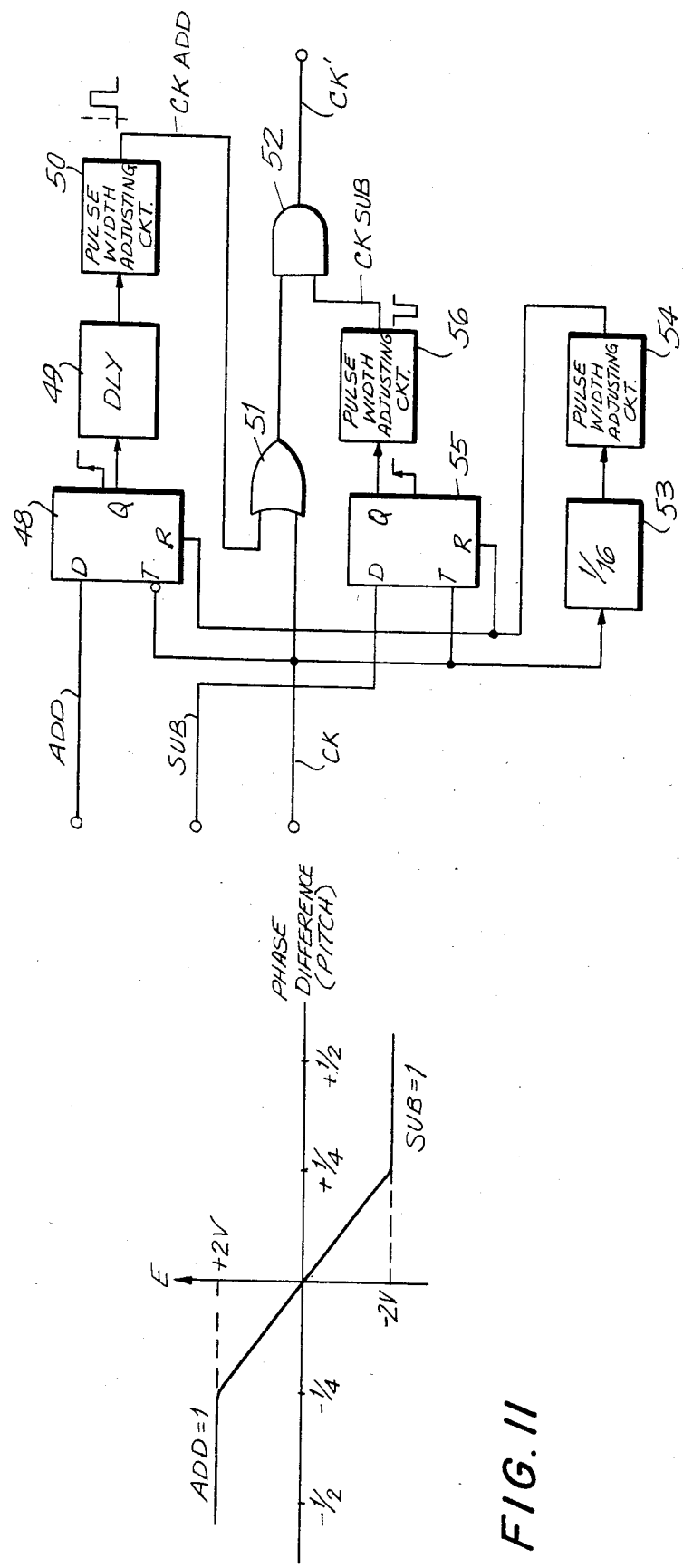
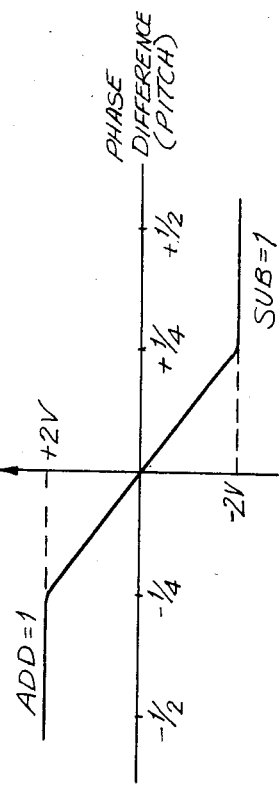

*FIG. 13A*
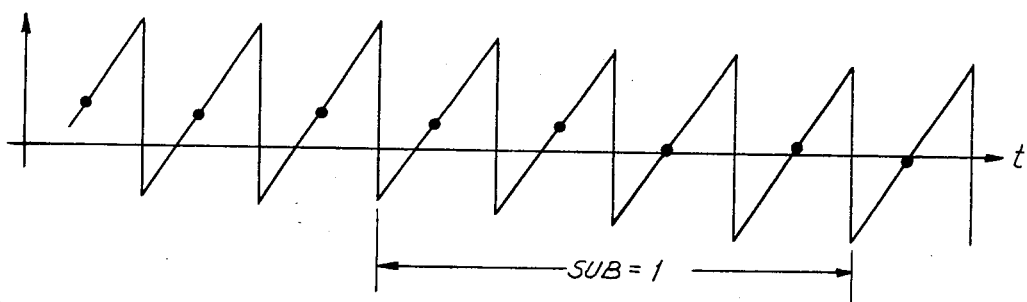
*FIG. 13B*
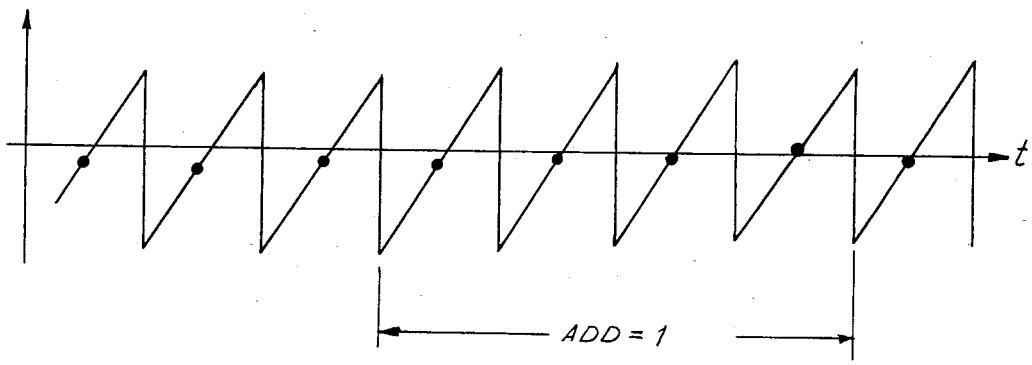
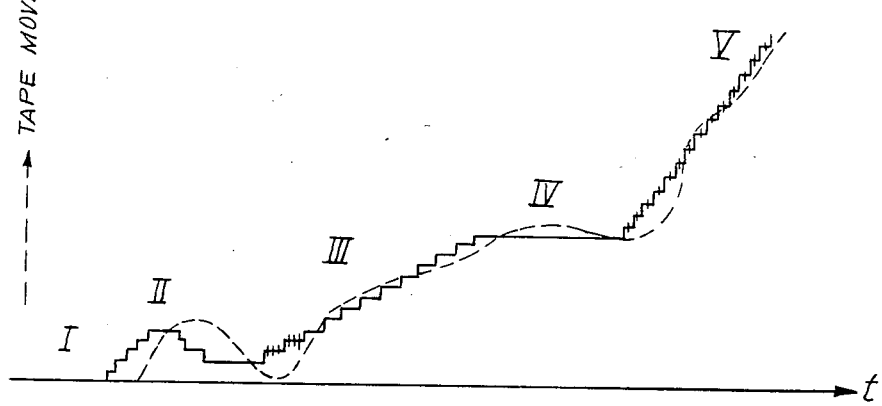
*FIG. 14*

METHOD AND APPARATUS FOR TRACKING CONTROL

BACKGROUND OF THE INVENTION

This invention relates to a method and apparatus for tracking control and, more particularly, to a method and apparatus for controlling the movement of a record medium having skewed tracks thereon which are scanned by a transducer when the medium is commanded to move at a speed and distance which are variable, such that the transducer accurately scans, or tracks, the record tracks.

Video recorders are used to record video signals on a record medium, such as a magnetic tape, a magnetic sheet, a magnetic disc, an optical video disc, a capacitive video disc, and the like, which video signals subsequently are reproduced and used, for example, to broadcast previously recorded video programs. Typically, special effects are obtained by reproducing the video signals at different playback speeds, such as fast-motion, slow-motion, still-motion and reverse-motion speeds. Also, in producing a video program, it often is necessary to edit various segments or portions so as to formulate a complete program. Typically, such editing is facilitated by advancing (or reversing) the record medium at slow speeds when searching for the optimum location at which edit points should be made. Once those points are ascertained and detected, information from one record medium may be transferred to another and either inserted into a "slot" or merely assembled so as to form the desired video program.

Techniques which have been developed for video signal recording, reproducing and editing, as well as the apparatus used therewith, have been adapted for other disciplines. For example, it has been proposed to use a video recorder to record digitized audio signals on the record medium. It also has been proposed to use a video recorder to record other digital information signals. The relatively high frequency band and high density of video recorders results in advantageous uses thereof for the foregoing as well as other purposes.

In a typical video recorder, such as a video tape recorder (VTR), a magnetic tape is helically wrapped around at least a portion of the periphery of a guide drum and is transported at a fixed speed for video recording. The guide drum typically includes a rotary section to which one or more recording transducers, or heads, are mounted. The longitudinal path along which the tape is advanced is at an angle with respect to the rotary path followed by the heads, thus resulting in successive, parallel, skewed tracks across the tape. During a recording operation, the tape speed as well as the rotary speed of the heads are servo-controlled such that uniform tracks of substantially constant pitch are recorded. It has become conventional to record a single field of video signals in each track and, in one format, the usual vertical synchronizing signals (referred to herein as the vertical sync signals) are recorded at the end of each track. Also, in a preferred recording format, the successive horizontal synchronizing signals (referred to as the horizontal sync signals) are aligned with one another from one track to the next. This alignment is the so-called H-alignment and minimizes undesired cross-talk from one track to the next due to the reproduction of non-aligned horizontal sync signals.

During the playback mode, if the tape is advanced at the same speed as during the recording mode, the servo system of the VTR is effective to bring the scanning trace of the reproducing transducer, or head, into coincidence with the previously recorded skewed tracks. Thus, for "normal" reproduction, each of the previously recorded record tracks is scanned accurately by the playback head or heads. However, during so-called non-normal playback modes, the speed at which the tape is transported differs from the recording speed, and this results in the scanning trace of a playback head to be at a discrete angle with respect to the track being scanned thereby. This angle is a function not only of the tape speed but also of the direction in which the tape is driven. Consequently, the video signals which are recorded in the successive tracks are not reproduced accurately.

To obtain accurate scanning, or tracking, of the previously recorded record tracks by the rotary playback head during non-normal, or "special effects" playback modes, various tracking control systems and techniques have been proposed. For example, in the tracking control systems described in U.S. Pat. Nos. 4,163,994, 4,172,264, 4,237,399, 4,287,538 and 4,296,443, the playback head is mounted on a deflecting device, generally referred to as a bi-morph leaf, which deflects in response to a drive voltage supplied thereto so as to correspondingly deflect, or displace, the head. Deflections of the bi-morph leaf, which may be, for example, a piezo-ceramic material, thus may be controlled so as to urge the head into proper tracking alignment with the track being scanned, even though the normal trace of the head would not coincide with the track during special effect playback modes. Deflection of the bi-morph leaf is controlled by sensing the error between the actual scanning trace of the head and the track, and then adjusting the drive voltage supplied to the bi-morph leaf in a manner which reduces this error to a null value.

During the still motion reproduction mode, the tape is maintained stationary and the playback head scans the same track repeatedly. In this mode, the head is deflected during each scan, typically by a variable amount during the length of the scannning trace, to bring it into alignment with the stationary track. At the completion of one scanning trace, the head is brought back to its initial position so as to be in alignment with the beginning of the scanned track during the next scanning trace. During this mode of operation, the head is caused to "jump" or "fly-back" by the same amount at the end of each trace. Similarly, during slow-motion, fast-motion or reverse-motion modes, the head must be jumped, or caused to fly-back, at the end of each trace so as to be in proper position to scan the correct record track during its next trace. Of course, since the tape is transported during these modes, a head jump, or fly-back, at the end of every trace sometimes is omitted. For example, during slow-motion reproduction, after a number of successive traces of the same track, the tape movement will be such that the next track is brought into position to be scanned. Consequently, rather than jump back to the beginning of the previously scanned track, the head is brought into position so as to scan this next track. This may be achieved by, for example, inhibiting the head jump or fly-back at that time. Also, during the fast-motion mode of reproduction, the tape may be moving at a speed such that, at the completion of the scanning of one track, the tape is sufficiently advanced that the head skips the next adjacent track and scans the following track. In scanning every other, or alternate, tracks, the aforementioned head jump, or fly-back, is not carried out.

If the tape is transported at a uniform speed, and the particular mode of signal reproduction is known, the angle, or slope, of the scanning trace may be corrected, i.e. brought into alignment with the track being scanned, by a drive voltage of, for example, constant slope. Then, at the completion of the scanning trace, this drive voltage is reset and a so-called head-jump voltage is applied to the bi-morph leaf to deflect the head into proper position for the next trace. It is desirable to apply a slope-correcting voltage, as well as a head-jump voltage, within predetermined limits so as to avoid over-driving, or overloading, the bi-morph leaf. Ideally, both the slope-correcting and head-jump voltages should be minimized, or at least maintained below a predetermined maximum limit. For example, during slow-motion reproduction modes, after a particular track is scanned a number of times, the tape may be sufficiently transported that the drive voltage next supplied to the bi-morph leaf might be too large if the same track is scanned again rather than if the next track is scanned. In this instance, it is desirable to inhibit the head-jump voltage and enable the head to scan the next-following track. Thus, proper control over the head-jump, or fly-back, is needed so as to avoid overloading the bi-morph leaf. In one head-jump control proposal, the drive voltage applied to the bi-morph leaf is detected; and when this drive voltage exceeds a predetermined amount, such as the amount which approaches the physical limit of the bi-morph leaf, the deflection of the head is controlled whereby the next-following track is scanned. Hence, the head is not caused to fly-back, which, if allowed, would result in a drive voltage that could overload the bi-morph leaf during the next scan. Unfortunately, the physical deformation limits of a bi-morph leaf generally change with age. Hence, the detected drive voltage might not be an accurate indication of the loading on the bi-morph leaf.

Another head-jump control technique is to determine when the head should be caused to fly-back as a function of the frequency and phase of the reproduced horizontal sync signals. The frequency and phase of these signals change as a function of the speed and distance at which the tape is transported. The deflection of the playback head during special effects modes results in a deflection component in the longitudinal direction (i.e., the direction of transport) of the tape. This component is equivalent to tape movement and, therefore, imparts changes in the frequency and phase of the horizontal sync signals which are reproduced by the head. Since these changes are due to the actual deflection of the head and not due to changes in the characteristics of the bi-morph leaf or its control circuitry, such changes in the frequency and phase of the reproduced horizontal sync signals provide an accurate indication of the degree of deflection and, thus, can be used to determine when a head-jump, or fly-back, should be carried out or inhibited.

Yet another head-jump control proposal is set out in copending application Ser. No. 06/347,486, now U.S. Pat. No. 4,445,146.

In the foregoing proposals for controllig head-jump so as to avoid overloading the bi-morph leaf, it is assumed that the tape is transported at a uniform speed during the special effect reproduction mode. While such uniform speed generally is attained in most instances, it is not unusual for the tape to be transported at a non-uniform, or irregular speed during an edit operation. A manual control may be provided whereby the tape is advanced or reversed irregularly, as in a stepping motion, by which the editor steps from field-to-field in order to ascertain a desired edit point. For example, a so-called "jog wheel" may be rotated by the editor so as to transport the tape in a direction determined by the direction of rotation of the jog wheel and at a speed determined by the speed of rotation of that wheel. Of course, even during such irregular movements of the tape, it is desirable for the head to track the previously recorded record tracks properly. Thus, the deflection of the head in response to drive voltages applied to the bi-morph leaf must be controlled so as to bring the scanning traces into coincidence with the scanned tracks. Unfortunately, the tape transport system exhibits electrical and mechanical time delays and inertia such that the actual movement of the tape is delayed from the commanded movement thereof, that is, the tape is delayed with respect to the operation of the aforementioned jog wheel. Such delays result in errors of the scanning traces with respect to the tracks. When the aforenoted tracking control systems are used during such edit modes, undesired noise and jitter are present in the video picture which is reproduced from the scanned tracks due to misalignment of the scanning traces with respect to such tracks.

OBJECTS OF THE INVENTION

Therefore, it is an object of the present invention to provide an improved method and apparatus for tracking control which avoids the aforenoted deficiencies, disadvantages and drawbacks.

Another object of this invention is to provide an improved method and apparatus for controlling the movement of a record medium that is subjected to variable transport speeds while being scanned by a movable transducer.

A further object of this invention is to provide a method and apparatus for controlling the scanning of a record medium, such as a tape, by a movable transducer, such as a rotary head, which head is capable of being deflected so as to track pre-recorded record tracks while the record medium is subjected to variable movement.

A more specific object of this invention is to provide a method and apparatus for controlling the movement of a video tape which is commanded to be moved at variable speeds during an edit mode and which is scanned by a playback head that is deflected to scan the tape properly and within predetermined limits.

Yet another particular object of this invention is to provide a method and apparatus for minimizing the deflection of a scanning head which is rotatably driven to scan successive traces across a record medium, the latter being moved by command and being subjected to time errors in responding to such command.

An additional specific object of this invention is to incrementally adjust the speed at which a record medium is transported to compensate for time errors in transporting the record medium in response to command signals while scanning particular tracks across the record medium.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus are provided for controlling the movement of a record medium having previously recorded, skewed tracks therein which are scanned by a transducer. The transducer is driven to scan traces which generally are disposed at an angle to the tracks, the angle being a function of the relative speed at which the record medium is commanded to move. The phase difference between a record track being scanned and the trace of the transducer is detected, preferably when the record medium has been commanded to be transported by a predetermined incremental amount; and the speed at which the record medium is transported is adjusted as a function of the detected phase difference.

In accordance with one aspect of this invention, the record medium is a tape, such as a magnetic video tape, and the transducer is a rotary playback head which scans successive traces across the tape. One feature of this invention is to sample the aforementioned phase difference when the tape has been commanded to move a distance equal to one-half of the pitch of the pre-recorded tracks.

Another feature of this invention is to generate command pulses, each pulse representing a predetermined incremental movement of the record medium; and the rate at which the medium is commanded to be transported is determined by the rate of the command pulses. Depending upon the aforementioned phase difference, pulses are either added to the command pulses, so as to cause an increase in the transport speed of the record medium, or selected ones of the command pulses are deleted so as to reduce the speed at which the medium is transported.

In the preferred embodiment of this invention, the rotary transducer is mounted on a deflectable element, and the latter is supplied with a drive voltage so as to bring the transducer into proper alignment with a track being scanned regardless of the actual speed at which the record medium is moved. Although there are time errors in the response of the tape transport mechanism to command signals applied thereto, such time errors are reduced so as to prevent significant deviations between the deflectable, rotary transducer and the tracks which are scanned thereby. When the present invention is used in a VTR, such as during an edit operation, the proper tracking of the record tracks results in the reproduction of a video picture that is substantially free of noise, jitter and interference.

BRIEF DESCRIPTION OF THE DRAWINGS

The following detailed description, given by way of example, will best be understood in conjunction with the accompanying drawings in which:

FIGS. 7A–7C are timing diagrams which are useful in understanding the operation of the present invention;

FIG. 8 is a timing diagram which is helfpul in understanding the operation of the phase difference detector shown in FIG. 1;

FIG. 10 is a block diagram of the pulse correction circuit illustrated in FIG. 1;

FIG. 11 is a graphical representation of the operation of the level detector circuit shown in FIG. 10;

FIG. 12 is a logic diagram of the pulse modulator shown in FIG. 10;

FIGS. 13A and 13B are graphical representations of the correction attained by the present invention;

FIG. 14 is a graphical representation of the manner in which time errors in the response of the tape drive mechanism to command pulses exhibit reduced influence on errors in the reproduction of a pre-recorded track.

BRIEF DESCRIPTION OF THE PREFERRED EMBODIMENT

Figure 1:
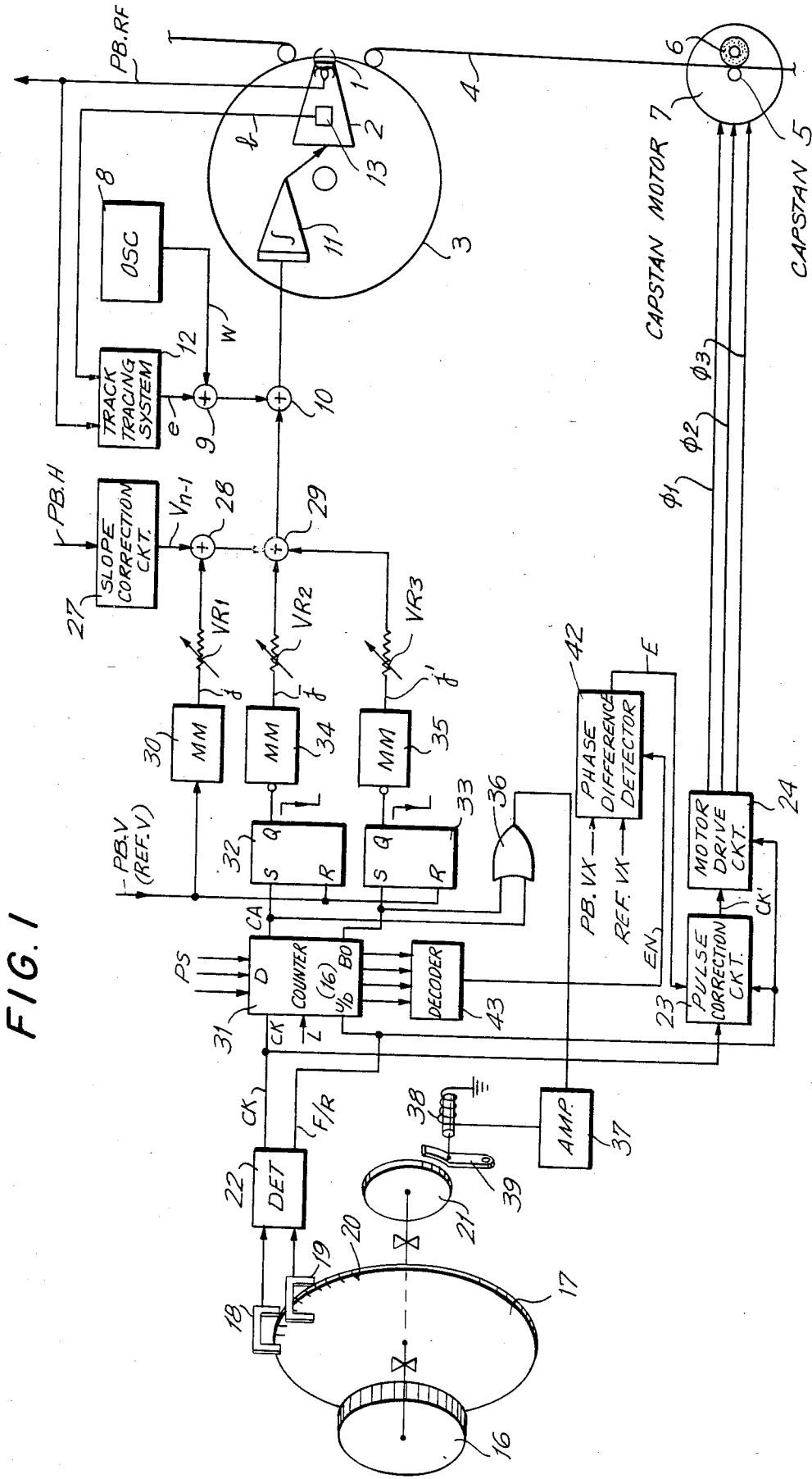
FIG. 1 is a block diagram of a tracking control system that is used preferably in a VTR, and wherein the present invention finds ready application.

For convenience, the present invention will be described in the environment of a video tape recorder (VTR) wherein video signals are recorded by a rotary transducer, or head, in skewed tracks on a movable magnetic tape. It will be appreciated, however, that other information signals may be recorded and, moreover, that the record medium need not be limited to a magnetic tape. Furthermore, since the present invention is particularly concerned with the tracking control of the rotary head during a signal reproduction operation, it will be recognized that the record medium from which pre-recorded signals are reproduced may be a tape, sheet, or a disc, the latter being a magnetic disc, a photo-optical video disc, a capacitive-video disc, or the like.

The VTR with which the present invention may be used includes at least one transducer 1 mounted on a deflectable support member 2, the latter being secured to the usual rotary portion of a rotary guide drum 3. In accordance with the example described herein, transducer 1 may be a magnetic recording/playback head; and since the present discussion is concerned with the tracking control of head 1 during a reproducing operation, it may be assumed that the head is a playback head. Deflectable support member 2, on which playback head 1 is mounted, may be a suitable electro-mechanical deflection device and, preferably, is a bi-morph leaf formed, for example, of two piezo-ceramic plates joined to each other. Bi-morph leaf 2 is secured to rotary drum 3 so that when the drum is rotated at, for example, a constant servo-controlled speed, head 1 scans successive scanning traces across the surface of a magnetic tape 4. Bi-morph leaf 2 is responsive to drive voltages supplied thereto so as to deflect in a direction transversely of the scanning direction of head 1. This deflection of the bi-morph leaf serves to adjust, or correct, the position of head 1 so that its scanning trace may be adjusted and brought into alignment with pre-recorded tracks that are recorded on the magnetic tape.

As is conventional, the guide drum is provided with suitable guide members such that tape 4 is helically wrapped, or deployed, about a circumferential portion of the guide drum. The tape is bi-directionally transported and, during a recording operation, the tape is transported at a uniform, servo-controlled speed in its forward direction while head 1 rotates uniformly so as to helically scan the tape. In this manner, successive skewed tracks of video signals are recorded, or laid down, on tape 4. The tape transport mechanism includes a capstan 5 which cooperates with a pinch roller 6 so as to frictionally engage and drive the tape at a speed determined by the rotary speed of the capstan. As schematically illustrated in FIG. 1, capstan 5 is driven by a capstan motor 7 which, preferably, is a three-phase pulse-driven motor. The manner in which head 1 is rotated and tape 4 is transported so as to record or reproduce video signals in skewed tracks on the tape is well known to those of ordinary skill in the art.

In the embodiment illustrated in FIG. 1, head 1 is adapted to reproduce video signals from tape 4. Furthermore, this signal reproduction is adapted to be carried out in various modes, such as slow-motion, still-motion, fast-motion and reverse-motion modes. In addition to these special effects modes of reproduction, the video signals are, of course, adapted to be reproduced in the so-called normal mode wherein tape 4 is driven at substantially the same speed as during the original recording mode. In all the foregoing modes of reproduction, that is, in both the special effects and normal modes, the speed at which tape 4 is transported may not be precisely equal to its recording speed. Consequently, the successive traces scanned by head 1 as the head rotates may not be in alignment with the pre-recorded record tracks and, moreover, such scanning traces may not be parallel to such tracks. Consequently, the usual servo-control systems which are provided for controlling the transport of tape 4 and the rotation of head 1 may not be sufficient to bring such scanning traces into coincidence with the scanned tracks. This problem of tracking control has been addressed in the aforementioned patents; and FIG. 1 includes a diagrammatic representation, in block diagram form, of control apparatus by which bi-morph leaf 2 is controllably deflected so as to bring head 1 into proper alignment with the scanned tracks.

The tracking control system includes an oscillator 8, a tracking error signal generator 12, an integrator 11 and a slope correction circuit 27. Oscillator 8 is adapted to generate an oscillating signal W of substantially constant, relatively lower frequency, this oscillating signal being designated the "dithering" signal. Dithering signal W is adapted to be supplied to integrator 11 via adder circuits 9 and 10.

Tracking error signal generator 12 is adapted to generate a tracking error signal e which represents the positional error between the trace of head 1 across tape 4 and the track which is scanned thereby. The tracking error signal generator includes an input terminal coupled to head 1 and adapted to receive the video signals which are reproduced by that head from the scanned tracks. Typically, the video signals which are recorded in such record tracks are frequency-modulated signals at radio frequencies (RF). Hence, head 1 is adapted to reproduce and supply such RF-FM signals to tracking error signal generator 12. Another input of this tracking error signal generator is coupled to a strain gauge 13 disposed on bi-morph leaf 2. As is known, the strain gauge is adapted to produce a signal which represents the actual deflection of the bi-morph leaf. As is usual, the bi-morph leaf is driven by dithering signal W so as to dither, or oscillate, from side-to-side across a record track scanned thereby. Strain gauge 13 supplies to tracking error signal generator 12 a signal representing this dithering of the bi-morph leaf. Tracking error signal generator 12 functions in a manner similar to that described in U.S. patent application, Ser. No. 152,117, filed May 21, 1980, now U.S. Pat. No. 4,361,856, to produce the tracking error signal e in response to the RF-FM signal supplied thereto by head 1 and the output signal supplied by strain gauge 13. It is appreciated that the RF-FM signal includes a component which is attributed to the dithering of head 1, as well as a component attributed to the actual tracking error between the trace of the head and the track scanned thereby. Tracking error signal generator 12 may include an envelope detector for detecting the envelope of the RF-FM signal, and a synchronous detector for detecting the tracking error component in that envelope by using the output of strain guage 13 as a detecting signal. Consequently, and as described in the aforementioned application, tracking error signal e is an accurate representation of the actual tracking error of the head relative to the track scanned thereby.

Adder circuit 9 combines the tracking error signal e and the dithering signal W to produce a drive voltage, this drive voltage being applied via adder circuit 10 and integrator 11 to bi-morph leaf 2. The bi-morph leaf responds to the drive voltage supplied thereto so as to bring the average trace of head 1 into alignment with the track scanned thereby and, moreover, to dither head 1 back-and-forth across the track which is scanned.

When tape 4 is transported at a speed which differs from the tape transport speed during a recording operation, such as when the tape is transported during a special effects mode, the trace of head 1 is inclined, or angled, with respect to the track being scanned. In general, this inclination of the scanning trace is a function of the relative speed of tape 4. If this relative speed is represented as the ratio n, such that $n=1$ when the reproducing and recording speeds are equal, $n>1$ during fast-forward modes, $n<1$ during slow-motion modes and $n<0$ for reverse-motion modes, then the inclination of the scanning trace of head 1 relative to the track scanned thereby is a function of n. Slope correction circuit 27 is adapted to produce a slope-correction voltage level $V_{n-1}$ as a function of the inclination of the scanning trace. As discussed in the introductory portion of this specification, the inclination of the scanning trace may be derived from the horizontal sync signals which are reproduced by head 1. More particularly, the frequency and phase of these reproduced horizontal sync signals are a function of the speed of tape 4, that is, they are a function of the speed ratio n, as well as a function of the deflecting movement of head 1. Consequently, the reproduced horizontal sync signals, identified herein as PB.H, provide a relatively accurate indication of the inclination of the scanning trace relative to the track being scanned. As shown in FIG. 1, slope correction circuit 27 is supplied with the reproduced horizontal sync signals PB.H and generates, in response thereto, the slope correction voltage $V_{n-1}$. It will be seen that this slope correction voltage is supplied, via adder circuits 28, 29 and 10, to integrator 11 whereat the slope correction voltage level is integrated and supplied as a gradually increasing or decreasing voltage to correspondingly deflect bi-morph leaf 2. In this manner, the inclination of the scanning trace of head 1 relative to the track being scanned is corrected.

Figure 2:
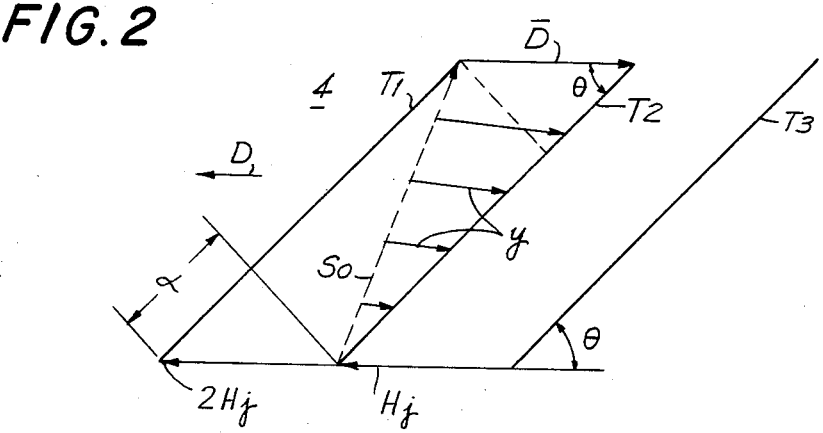
FIG. 2 is a diagrammatic representation of the manner in which a rotary transducer is controllably deflected to scan a pre-recorded record track.

An example of the manner in which the inclination, or slope, of the trace of scanning head 1 is corrected is graphically represented in FIG. 2. Let it be assumed that the track designated $T_2$ is intended to be scanned by head 1. Let it be further assumed that the transport speed of tape 4 is such that head 1 scans the trace $S_0$, represented by the broken line in FIG. 2. For example, trace $S_0$ will be scanned relative to tape 4 when the tape is maintained stationary, i.e., when the apparatus operates in its still-motion mode. From FIG. 2, it will be appreciated that, in the absence of any compensation or correction to the slope of trace $S_0$, track $T_2$ will not be scanned properly. It is, therefore, necessary to deflect bi-morph leaf 2 so as to displace head 1 in the direction indicated by arrows y. The amount of displacement of the head and, thus, the magnitude of the drive voltage which is supplied to the bi-morph leaf, is seen to increase gradually over the length of trace $S_0$. Moreover, this gradual increase in the drive voltage is approximately linear over the length of the scan. It will be apparent that slope correction circuit 27 provides the correction voltage $V_{n-1}$ to integrator 11 which, upon integration, results in the gradual, substantially linear increasing drive voltage which may also be represented by arrows y in FIG. 2. Consequently, as head 1 scans a trace across tape 4, its trace $S_0$ is brought into proper alignment with track $T_2$. The magnitude of the slope correction voltage level $V_{n-1}$ produced by slope correction circuit 27 is a function of the speed ratio n of tape 4. In the present example, n=0. This relationship is indicated by the frequency and phase of the reproduced horizontal sync signals PB.H. Accordingly, the slope correction voltage level $V_{n-1}$ produced by the slope correction circuit in response to the frequency and phase of the reproduced horizontal sync signals is sufficient to correct the slope, or inclination, of scanning trace $S_0$ such that head 1 properly tracks track $T_2$.

The apparatus illustrated in FIG. 1 is particularly adapted to transport tape 4 at a random, irregular speed which, typically, is used when editing signals on the tape. For example, an operator may wish to vary the speed at which the tape is transported and, thus, the speed, or rate, at which a displayed video picture, which is derived from the pre-recorded video signals, changes on a display monitor. This facilitates the location of a desired edit point at which additional video signals may be inserted or added to those already recorded on tape 4. In order to permit such irregular tape movements, the apparatus shown in FIG. 1 is provided with a suitably manually operable device, referred to herein as a jog wheel 16, a detector circuit 22, a counter 31, tape speed control circuitry including a phase difference detector 42, a pulse correction circuit 23 and a motor drive circuit 24, and pulse generators 30, 34 and 35. The jog wheel is manually operable to command the movement of tape 4 in a direction determined by the direction of angular rotation of the jog wheel, and at a speed determined by the rotary speed of the jog wheel. For example, if the jog wheel is rotated in the clockwise direction, tape 4 is advanced. A counterclockwise rotation of jog wheel 16 results in reverse movement of the tape. Likewise, rapid rotation of the jog wheel results in a higher tape speed than slower rotation of the wheel.

Jog wheel 16 is coupled to a disc 17 which rotates with the jog wheel, the disc being provided with indicia 20, such as slits, circumferentially arranged about the periphery of the disc. Disc 17 may comprise an encoding disc wherein indicia 20 are sensed as the disc is rotatably driven by jog wheel 16. If indicia 20 are formed of slits, these slits may be optically detected by a pair of quadrature-related photodetectors 18 and 19. As is conventional, each photodetector may include a source of light and a light detector. A suitable pulse is produced by the light detector when a slit 20 rotates through the light beam directed from the light source to the detector. Alternatively, if indicia 20 are formed of, for example, magnetic elements, detectors 18 and 19 may comprise magnetic sensors which are adapted to generate pulses when a magnetic element rotates therepast. It will be appreciated, that, indicia 20 may comprise other suitable marks or indicia which may be detected by compatible detecting devices.

As mentioned above, detectors 18 and 19 preferably are quadrature-related to each other. As is known, this quadrature-relationship is advantageous in determining the actual rotation of disc 17. For example, when the disc rotates in one direction, the pulses generated by detector 18 lead the pulses generated by detector 19. When the disc rotates in the opposite direction, the pulses generated by detector 18 tend to lag the pulses generated by detector 19. Detector circuit 22 is coupled to detectors 18 and 19 and, depending upon the sensed direction of rotation of disc 17, detector 22 is adapted to produce a forward/reverse (F/R) direction control signal. For example, this direction control signal may be a binary "1" when disc 17 rotates in the clockwise direction and a binary "0" when the disc rotates in the counterclockwise direction. Detector 22 also is adapted to detect the pulses generated by, for example, detector 18 to produce clock pulses CK of predetermined shape. Thus, detector 22 generates clock pulses CK having a frequency determined by the angular speed at which jog wheel 16 is rotated; and the detector also produces the direction signal F/R, which is a function of the direction in which the jog wheel is rotated. It will be appreciated that the frequency, or pulse repetition rate, of clock pulses CK is directly proportional to the angular speed at which the jog wheel is rotated.

Counter 31 is a 16-step counter and is coupled to detector 22 to receive the clock pulses CK generated thereby. When the count of counter 31 is incremented from a count of 0 to a count of 16, an overflow, or carry pulse CA is generated. Thus, one carry pulse CA is produced in response to every sixteen clock pulses CK supplied to counter 31.

Counter 31 is an up/down counter; and the counting direction thereof is determined by the direction control signal F/R. As illustrated, the counter includes an up/down control terminal coupled to detector 22 to receiving the direction control signal F/R. When the direction control signal is indicative of a commanded forward movement of tape 4, such as a binary "1", counter 31 is conditioned to count clock pulses CK in the upward direction; and, as described above, after sixteen clock pulses have been counted, the carry pulse CA is produced. Conversely, counter 31 is adapted to count clock pulses CK in the downward direction in response to the direction control signal indicative of reverse movement of tape 4, such as a binary "0". When sixteen clock pulses have been counted in the downward direction such that the count of counter 31 is decremented from a count of 0 to a count of 16, a borrow pulse BO is produced. Thus, it is seen that a carry pulse CA or a borrow pulse BO is generated by counter 31 after sixteen consecutive clock pulses CK have been counted in the upward or downward direction, respectively.

Counter 31 also includes a load input connected to receive a load signal so as to be preset to a count supplied thereto from a source of preset count signal PS. For a purpose that is described in greater detail below, the preset count to which counter 31 is loaded is equal to a count of 8, that is, a count that is midway between the minimum and maximum count of the counter.

As will also be explained below, the load signal supplied to counter 31 is adapted to be produced when tape 4 is maintained stationary for a predetermined period of time. It is recognized that this stationary condition obtains when the illustrated apparatus is operated in the still motion mode. Thus, if jog wheel 16 is not rotated for a predetermined time period, such as 2 seconds, the load pulse is generated. As one example, a retriggerable monostable multivibrator may be supplied with clock pulses CK. The monostable multivibrator is triggered to its quasi-stable state in response to a clock pulse CK; and remains in this quasi-stable state so long as the next clock pulse is received prior to the completion of the time-out period of the monostable multivibrator. If this time-out period is selected to be on the order of about 2 seconds, it is seen that the load pulse will be generated by the return of the monostable multivibrator to its stable state in the event that a succeeding clock pulse CK is not produced within the two-second time-out period. Hence, counter 31 is preset to a count of, for example, 8 in response to the load pulse which is supplied thereto when no tape movement has been commanded for a predetermined period, such as a period on the order of 2 seconds.

Carry pulse CA produced by counter 31 is coupled to the set input S of a flip-flop circuit 32, the Q output of which is coupled to the trigger input of monostable multivibrator 34. Similarly, the borrow pulse BO produced by counter 31 is coupled to the set input S of a flip-flop circuit 33 whose Q output is coupled to the trigger input of monostable multivibrator 35. Flip-flop circuits 32 and 33 have their reset inputs R connected in common to receive the vertical sync signal which is reproduced from tape 4 by head 1. As illustrated in FIG. 1, this reproduced vertical sync signal is identified as PB.V. It is appreciated that this vertical sync signal is recorded at the terminal portion of a record track and, thus, is reproduced by head 1 when the head reaches the vicinity of the completion of its scanning trace. As an alternative to the reproduced vertical sync signal PB.V, the reset inputs R of flip-flop circuits 32 and 33 may be supplied with a reference vertical synchronizing signal, designated REF.V, which may be generated by a suitable detector which detects when head 1 rotates to the terminal portion of its trace. The reproduced vertical sync signal PB.V and the reference vertical sync signal REF.V both are generated at approximately the same time during the scanning of a record track.

In addition to being supplied to the reset inputs R of flip-flop circuits 32 and 33, the reproduced vertical sync signal PB.V (or the signal REF.V) is supplied to the trigger input of monostable multivibrator 30. This monostable multivibrator is triggered to produce a head fly-back pulse j which, as will be described, serves to deflect bi-morph leaf 2 so as to cause head 1 to jump, or fly-back, to an initial scanning position. The magnitude of this head-jump, or fly-back, pulse j is adjusted by a variable resistor $VR_1$; and the adjusted head-jump pulse is supplied as a component of the bi-morph leaf drive voltage via adder circuits 28, 29 and 10, and integrator 11.

It should be appreciated that the pre-recorded record tracks exhibit a predetermined pitch therebetween. The magnitude of the head-jump pulse j, as adjusted by adjustable resistor $VR_1$, is sufficient to deflect head 1 by a distance corresponding to the track pitch. The manner in which the head is deflected in response to this head-jump pulse will be described further below.

Each clock pulse CK is adapted to command the transport mechanism to transport tape 4 by a predetermined incremental distance. In the example described herein, each clock pulse CK is effective to command the tape to be transported by a distance equal to 1/16 of the track pitch. Thus, when sixteen consecutive clock pulses CK have been generated, tape 4 is commanded to be moved through a distance equal to the track pitch. It is recalled that this tape movement distance may be either in the forward direction or the reverse direction, depending upon the logic state of direction control signal F/R. Accordingly, counter 31 is adapted to produce the carry pulse CA or the borrow pulse BO when tape 4 has been commanded to move a distance equal to the track pitch in the forward or reverse direction, respectively. If tape 4 moves in synchronism with the clock pulses CK, then the carry pulse CA and the borrow pulse BO are indicative of a shift in the position of the tape equal to the distance between successive tracks. Since a field of video signals is recorded in each track, the carry and borrow pulses may be considered to be indicative of a change in the field which is scanned by head 1. These pulses thus may be referred to as track-shift or picture-shift pulses because they represent a shift in the tape by a distance equal to one track pitch, which means an effective shift in the picture which is reproduced by head 1. Depending upon the direction of movement of tape 4, flip-flop circuit 32 or flip-flop circuit 33 is set in response to the track-shift (or picture-shift) pulse. That is, when tape 4 has been transported (or more accurately, commanded to be transported) by a distance equal to one track pitch so as to dispose the next track in position to be scanned, flip-flop circuit 32 or flip-flop circuit 33 is set. Then, when head 1 completes its scanning trace so as to reproduce the vertical sync signal PB.V (or when the signal REF.V is produced), the set flip-flop circuit is reset.

Monostable multivibrators 34 and 35 are of the so-called negative-edge triggering type. Hence, when flip-flop circuit 32 is reset, monostable multivibrator 34 is triggered to produce a head-jump inhibit pulse j. The amplitude of this head-jump inhibit pulse is suitably adjusted by variable resistor $VR_2$, and combined with the head-jump pulse j in adder circuit 29. Advantageously, head-jump inhibit pulse j is equal and opposite to head-jump pulse j so as to cancel the head-jump pulse in adder circuit 29.

When monostable multivibrator 35 is triggered by the resetting of flip-flop circuit 33, the monostable multivibrator generates a track-jump pulse j' The magnitude of this track-jump pulse is adjusted by variable resistor $VR_3$, and the adjusted track-jump pulse j' is combined with head-jump pulse j in adder circuit 29. If the track-jump pulse is equal to the head-jump pulse, the resultant pulse supplied to bi-morph leaf 2 is sufficient to deflect the bi-morph leaf so as to deflect head 1 to a position whereby the next preceding track may be scanned thereby.

Clock pulses CK, as well as direction control signal F/R, also are supplied to motor drive circuit 24 via pulse correction circuit 23. The motor drive circuit functions to generate 3-phase drive pulses $\phi_1$, $\phi_2$ and $\phi_3$ in response to each clock pulse CK supplied thereto. These 3-phase drive pulses are used to drive 3-phase capstan motor 7 in a direction determined by direction control signal F/R, and at a speed determined by the repetition rate of the clock pulses CK. As an example, capstan motor 7 may comprise a 3-phase hysteresis synchronous motor. Advantageously, capstan 5, which is driven by capstan motor 7, exhibits a diameter such that the angular rotation of the capstan in response to each clock pulse CK is sufficient to transport tape 4 (in either the forward or reverse direction) a distance equal to 1/16 of the track pitch. Hence, sixteen consecutive clock pulses CK supplied to motor drive circuit 24 are effective to rotate capstan 5 so that tape 4 is transported by one track pitch. Hence, in response to sixteen clock pulses, the next adjacent track recorded on tape 4 is disposed in position to be scanned by head 1. This means that the picture which is reproduced from the video signals that are played back from the scanned track is shifted from one field to another when the tape has been transported through this distance.

Ideally, motor drive circuit 24, capstan motor 7, capstan 5 and pinch roller 6 all cooperate so as to transport tape 4 in synchronism with each clock pulse CK that is generated by detector 22. That is, in the ideal condition, each command pulse CK that is produced by rotating jog wheel 16 results in almost immediate movement of tape 4 by the distance equal to 1/16 track pitch. However, the motor drive circuit and capstan motor exhibit electrical time delays and, more significantly, capstan 5 and pinch roller 6 exhibit mechanical inertia and delays such that the tape is not transported in synchronism with the command clock pulses CK. Hence, time errors are present between the commanded movement, as represented by a command pulse CK, and the actual physical movement of tape 4. Such time errors are compounded by a slip between capstan 5 and tape 4, as well as inevitable stretching of the tape. Consequently, the ideal condition is not attained; and the operation of jog wheel 16 is not carried out in perfect correspondence with the movement of tape 4. Hence, although the jog wheel may be operated by a sufficient amount so as to command a track shift (or picture shift), the aforementioned time errors may delay the actual movement of the tape so that the next adjacent track is not yet properly disposed in position to be scanned by head 1. It may be recognized that, for forward movement of tape 4, such time errors may appear as a lag between the commanded position of the tape and the actual shifting of the track to be scanned; and for reverse motion of the tape, this time error may appear as a time-lead. In either event, the time error may result in noise, jitter and interference in the video picture which ultimately is reproduced from the video signals that are played back by head 1. Pulse correction circuit 23, which is described in greater detail below, is adapted to compensate for such time errors and to adjust the actual speed, or movement, of tape 4 so as to minimize such time errors.

Figure 3A:
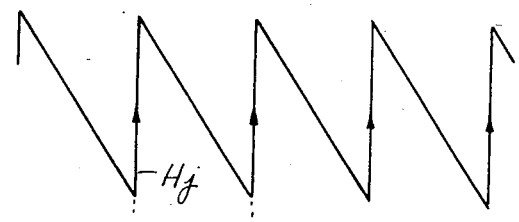
FIGS. 3A–3E are timing diagrams which are useful in understanding the tracking control technique which is carried out by the apparatus shown in FIG. 1.

For a better understanding of the manner in which the aforementioned time errors are corrected, reference first will be made to the manner in which head 1 is controllably deflected to properly scan the pre- recorded tracks on tape 4. Referring again to FIG. 2, it is assumed that tape 4 is maintained stationary, and if the movement of head 1 were not corrected head 1 would scan the trace $S_0$ as illustrated to carry out the still-reproduction mode. As mentioned above, in this mode of operation, slope correction circuit 27 supplies the slope correction voltage $V_{n-1}$ to integrator 11, whereupon a gradually increasing drive voltage is supplied to bi-morph leaf 2 to gradually and increasingly deflect head 1. The head thus is deflected, or displaced, as represented by arrows y, whereby the scanning trace $S_0$ of head 1 is brought into substantial coincidence with track $T_2$. FIG. 3A is a timing diagram representing the integrated slope correction voltage that is applied to bi-morph leaf 2 from integrator 11. The slope of the drive voltage shown in FIG. 3A is negative to represent that the head is displaced in the direction illustrated by arrows y in FIG. 2. If the bi-morph leaf is driven so as to displace head 1 in the opposite direction, the slope of the drive voltage illustrated in FIG. 3A would be positive.

As shown in FIG. 2, at the completion of each scanning trace, head 1 must be deflected by an amount sufficient to return the head to the beginning of track $T_2$ then being scanned thereby. That is, at the completion of each scan of track $T_2$, the head must be jumped, or caused to fly-back, from its instantaneous position back to a position in registration with the beginning of track $T_2$. It should be recognized that, in the absence of this head-jump, or fly-back, after completing its scan across track $T_2$, the head would be in position to commence the scanning of track $T_3$. Consequently, in order to return the head to the beginning of track $T_2$, bi-morph leaf 2 must be driven so as to displace the head by a distance equal to the pitch of the tracks. In the still-motion mode of reproduction, this displacement is equal to $-1$ pitch, the negative sign indicating that the head is displaced to the next preceding track, that is, as shown in FIG. 2, the head is displaced from the beginning of track $T_3$ to the beginning of track $T_2$. In general, during special effects modes of reproduction wherein tape 4 is transported at a speed that is n times the speed at which the tape is transported during normal reproduction, the slope-correction voltage supplied to the bi-morph leaf should be equal to $(n-1)$ pitch at the completion of a scanning trace of head 1. In the still-motion mode shown in FIG. 2, it is seen that the slope-correction voltage at the completion of the scanning trace is equal to $-1$ pitch. Of course, during the normal mode of reproduction wherein $n=1$, the slope correction voltage at the completion of a scanning trace is equal to zero.

In the still-motion mode of reproduction, the slope correction voltage $V_{n-1}$ generated by slope correction circuit 27 is a function of the scan vector of head 1. This scan vector is the sum of the tape speed vector $\overline{D}$ and the longitudinal component, or vector, of trace $S_0$. Since $\overline{D}=0$, it is seen that the slope correction voltage $V_{n-1}$ in the still reproduction mode is equal to $-1$ pitch.

If the distance by which head 1 must be displaced from its normal, or unbiased position at the completion of its scanning trace $S_0$ so as to coincide with track $T_2$ is represented as $\overline{D}$, then it will be seen that head 1 completes its scanning trace prior to reaching the end of track $T_2$. The distance between the end of the scanning trace $S_0$, when brought into alignment with track $T_2$, and the end of this track is $\overline{D} \cos \theta$, wherein $\theta$ is the slant angle, or skew, of the tracks with respect to the longitudinal direction of tape 4. Now, if a field interval is represented as $\bar{V}$, since one field is recorded in track $T_2$, it will be seen that the length of the scanning trace of head 1 along track $T_2$ during one vertical scan period is reduced by $\bar{V}.\bar{D}.\cos \theta$. This reduction in the length of the scanning trace is shown in FIG. 2 as being equal to $\alpha$. This amount $\alpha$ is equal to the shift, in the scanning direction, from one track (e.g. track $T_1$) to the next (e.g. track $T_2$). As is known to those of ordinary skill in the VTR art, it is advantageous for the successive tracks to be recorded in so-called H alignment, that is, the horizontal intervals in each recorded field are aligned with each other. There are 262.5 horizontal line intervals in each field of the NTSC system. Consequently, the overall reduction in length of the trace of head 1 along track $T_2$ is $\alpha$, and the reduction in the length of each horizontal line interval is $\alpha/262.5$. That is, the effective length of each horizontal line interval that is scanned by head 1 as the head scans track $T_2$ is reduced from its normal length by the amount $\alpha/262.5$. Consequently, the apparent period between successive horizontal sync pulses, that is, the apparent effective length of each reproduced horizontal line interval H' is reduced from its normal horizontal line interval length H by the amount $\alpha/262.5$, such that $H'=H-\alpha/262.5$. Therefore, during the still-motion mode, the period of the reproduced horizontal line interval is reduced by the amount $\Delta H$ from the normal horizontal line interval, wherein $\Delta H$ is $-\alpha/262.5$.

Similarly, it will be seen that, when tape 4 is transported in the forward direction at twice the normal speed (e.g. n=2), the effective length of the scanning trace of head 1 across track $T_2$, for example, is increased by the length $\alpha$. Hence, at 2X playback speed, the effective length of each horizontal line interval is increased by the amount $\Delta H = +\alpha/262.5$. The foregoing changes in the apparent period of each reproduced horizontal line interval may be detected by sensing the period, or frequency, of the reproduced horizontal sync pulses PB.H.

It will, therefore, be appreciated that slope correction circuit 27 may comprise, for example, a counter circuit to determine the apparent period of the reproduced horizontal line intervals. That is, the period between successive reproduced horizontal sync pulses PB.H may be measured to provide an indication of the playback speed at which tape 4 is transported. A digital-to-analog converter may be used to convert the measured count to a corresponding analog slope correction voltage $V_{n-1}$. Hence, the slope of scanning trace $S_0$ is corrected as a function of the detected playback speed of tape 4.

As an alternative, the speed at which tape 4 is transported during a playback operation may be determined directly by, for example, a frequency generator that is mechanically coupled to capstan 5. The output signal produced by this frequency generator may be converted to a corresponding slope correction voltage $V_{n-1}$ which, in turn, is integrated and used to deflect bi-morph leaf 2 so as to bring head 1 into proper alignment with the track being scanned.

As illustrated in FIG. 2, during the still-motion mode of reproduction, when head 1 completes its scan of track $T_2$, the head then is in position to commence the scanning of track $T_3$. That is, without further deflection of the head, it is in alignment with the beginning of track $T_3$. However, in order to carry out the still-motion mode of reproduction, the same track, for example, track $T_2$, is scanned successively and repeatedly. Consequently, for the still-motion mode of reproduction, head 1 must be displaced from its position in alignment with the beginning of track $T_3$ to the position whereby it is brought into registration with the beginning of track $T_2$. That is, in the still-motion mode, when the head completes its trace of track $T_2$, it must be jumped, or caused to fly-back, by an amount sufficient to bring it into proper alignment with the beginning of track $T_2$.

Figure 3B:
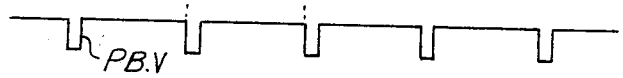
Figure 3C:

This head-jump operation is carried out by monstable multivibrator 30, described above. Thus, at the completion of the scan of track $T_2$, the reproduced vertical sync signal PB.V (or the reference vertical sync signal REF.V) is generated to trigger monostable multivibrator 30 which, in turn, produces the head-jump pulse j. FIGS. 3B and 3C represent the occurrence of the reproduced vertical sync signal PB.V at the time that the head completes its scanning trace of track $T_2$, and the generation of the head-jump pulse j in response to the reproduced vertical sync pulse. After being suitably level-adjusted by variable resistor $VR_1$, the head-jump pulse j is applied as a head-jump voltage $H_j$ (FIG. 3A) to bi-morph leaf 2 via adder circuits 28, 29 and 10, and by integrator 11. This head-jump voltage $H_j$ is seen to be produced during the normal vertical blanking interval at the time that head 1 traverses the "gap" in the tape which is wrapped about guide drum 3 (as shown in FIG. 1). Thus, head 1 jumps, or flies-back, to the position whereby it is brought into registration with the beginning of track $T_2$ during the vertical blanking interval. As shown in FIG. 2, the head-jump voltage $H_j$ is sufficient to deflect head 1 by an amount equal to the track pitch. Thus, at the completion of its scan of track $T_2$, head 1 is in position to scan the beginning of track $T_3$; and in the still mode of reproduction, the head-jump, or fly-back, voltage $H_j$ is produced to deflect the head by one track pitch so as to return it to the beginning of track $T_2$ at the beginning of its next scanning trace.

Monostable multivibrator 3 is triggered by each reproduced vertical sync pulse PB.V (or each reference vertical sync pulse REF.V), regardless of the particular reproducing mode of the VTR. Hence, head-jump pulse j (FIG. 3C) is produced at the completion of each scanning trace of head 1 in still-motion, slow-motion, fast-motion and reverse-motion modes. Accordingly, head 1 is deflected by a distance equal to one track pitch at the completion of each scan in such modes.

The foregoing has described the generation of head-jump pulse j and the displacement of head 1 during the still-motion mode of reproduction. Let it now be assumed that an operator rotates jog wheel 16 by an arbitrary angular amount. As described previously, the rotation of the jog wheel results in the generation of command clock pulses CK and direction control signal F/R. These pulses and signal are applied to motor drive circuit 24 so as to drive capstan motor 7 and correspondingly transport tape 4 in the commanded direction at the commanded speed by an amount established by the number of command clock pulses CK which have been generated. Clock pulses CK also are counted by counter 31 in the direction determined by direction control signal F/R. As also described above, counter 31 produces the carry pulse CA when a predetermined number (e.g. 16) of clock pulses have been counted in the forward, or upward, direction. Conversely, counter 31 produces the borrow pulse BO when this same predetermined number of clock pulses CK has been counted in the reverse, or downward direction. The carry and borrow pulses represent the commanded movement of tape 4 equal to a distance of one track pitch. The movement commanded by such predetermined number of clock pulses CK is effective to bring the next successive track recorded on tape 4 into position for scanning by head 1. Hence, and as mentioned previously, the carry and borrow pulses CA and BO are referred to as track-shift or picture-shift pulses, and these pulses are produced whenever tape 4 has been commanded to move through a distance equal to one track pitch.

As also mentioned above, regardless of the relative location of a track with respect to the scanning trace of head 1 at the time that a still-motion mode of reproduction is initiated, when no movement of jog wheel 16 for a predetermined interval (e.g. 2 seconds) is sensed, counter 31 is preset to an intermediate count of, for example, 8. It will be seen below that this intermediate count minimizes the time needed to correct the speed of capstan motor 7 so as to compensate for time errors in the tape transport system. Thus, immediately following the sensing of the still-motion mode, the first track-shift (or picture-shift) pulse CA or BO is produced after 8 clock pulses CK have been counted. Thereafter, successive track-shift (or picture-shift) pulses are produced when 16 consecutive clock pulses have been countd.

It will be appreciated that a track-shift or picture-shift pulse is produced at the proper time even if the operator reverses the rotation of jog wheel 16 while counter 31 is at some middle count. For example, if the jog wheel is rotated in the forward direction by an amount sufficient to produce 13 clock pulses CK, the count of counter 31 will be incremented to this count of 13. Then, if the jog wheel is rotated in the reverse direction, the clock pulses CK generated in response to such reverse rotation are counted in the reverse direction by counter 31. When this count is reduced from a count of 13 to a count of zero, and then a further reverse clock pulse is counted, the counter generates borrow pulse BO as the track-shift (or picture-shift) pulse.

Figure 3D:
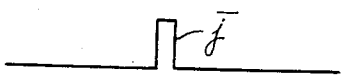

Let it be assumed that jog wheel 16 is rotated in the forward direction so as to command forward movement of tape 4. When the tape has been commanded to move a distance equal to one track pitch, the track-shift pulse CA produced by counter 31 sets flip-flop circuit 32 to be stored therein This flip-flop circuit is reset in response to the reproduced vertical sync pulse PB.V (or the reference vertical sync pulse REF.V) when head 1 completes its scan of a record track. As described above, at the completion of a scanning trace, head-jump pulse j (FIG. 3C) normally is produced to displace the head by one track pitch. Now, however, since the tape has been advanced by an amount sufficient to dispose the next track in position to be scanned by head 1, the head-jump, or fly-back, should be avoided. This is achieved by triggering monostable multivibrator 34 in response to the resetting of flip-flop circuit 32, thereby producing the head-jump cancel pulse j, shown in FIG. 3D. Variable resistor $VR_2$ is set so that the magnitude of head-jump cancel pulse j̄ is equal to head-jump pulse j. Consequently, the normal head-jump pulse j (FIG. 3C) which is produced at the completion of a scanning trace now is cancelled in adder circuit 29 by head-jump cancel pulse j̄. Accordingly, after the head completes its scan of, for example, track $T_2$, it is not returned to the beginning of that track but, rather, maintains its then-present position so as to be in alignment with the beginning of track $T_3$. Therefore, it is seen that when tape 4 is commanded to be moved a distance sufficient to bring the next track into position for scanning, the track-shift (or picture-shift) pulse CA is stored in flip-flop circuit 32 and is used, when the head completes its present scan, to trigger monostable multivibrator 34 so as to prevent the head-jump voltage $H_j$ from being produced. This, in turn, inhibits bi-morph leaf 2 from displacing head 1 by a track pitch which, if now carried out, would mis-align the head with respect to the next track to be scanned. Hence, during forward movement of tape 4, when the next track, or picture, is positioned for scanning by head 1, the head is controlled to scan this next track.

Figure 3E:
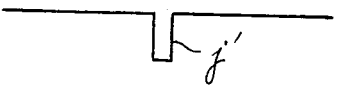

If jog wheel 16 is rotated in the reverse direction, the track-shift pulse BO is produced by counter 31 when tape 4 has been commanded to move in the reverse direction by a distance equal to one track pitch. This track-shift pulse is stored in flip-flop circuit 33 until head 1 completes its scan. At that time, the reproduced vertical sync signal PB.V (or the reference vertical sync signal REF.V) resets this flip-flop circuit so as to trigger monostable multivibrator 35. As shown in FIG. 3E, monostable multivibrator 35 generates the head-jump pulse j′ which is level-adjusted by variable resistor $VR_3$ so as to be substantially equal to the normal head-jump pulse j (FIG. 3C). Head-jump pulses j and j′ are added in adder circuit 29, resulting in a head-jump voltage $2H_j$ of twice the normal head-jump voltage. This head-jump voltage $2H_j$ is applied to bi-morph leaf 2 so as to deflect head 1 a distance equal to two track pitches, as shown in FIG. 2. Thus, when tape 4 is commanded to move in the reverse direction, after head 1 completes it scan of track $T_2$, the bi-morph leaf is driven so as to deflect the head by an amount sufficient to bring it into registration with the beginning of the next preceding track $T_1$.

From the foregoing description, it is appreciated that, when jog wheel 16 is rotated by an amount sufficient to generate 16 command clock pulses CK, counter 31 generates the track-shift pulse CA or BO, depending upon the direction of commanded tape movement, which, in turn, cancels or doubles the normal head-jump pulse j. Thus, when the tape has been commanded to move a distance equal to one track pitch in the forward direction, head 1 is not returned to the beginning of the last track scanned thereby but, instead, is maintained in its present position so as to scan the next-following track. Hence, the next picture is reproduced by the head in response to the track-shift pulse. Conversely, if the tape is commanded to move in the reverse direction by a distance equal to one track pitch, then, at the completion of its scanning trace, the head is deflected by a distance equal to two track pitches so as to bring it into proper scanning relationship with the next preceding track.

From the foregoing, it is seen that the track-shift pulse CA or BO which is used to shift the displacement of head 1 from one track to another, is generated as a function of the command pulses CK produced in response to the rotation of jog wheel 16. Although such command pulses are used by motor drive circuit 24 to drive capstan motor 7, it is appreciated that electrical and mechanical time constants, mechanical inertia and possible stretching of tape 4 may result in delays between a generated command clock pulse CK and the actual corresponding movement of tape 4 in response to that pulse. This means that head 1 may be controlled to scan the next track at a time when that next track possibly is out of scanning position. That is, since the track-shift control is relatively independent of tape movement, the scanning trace of the head may be shifted from one track to the next before the next track is sufficiently advanced into proper scanning position. Hence, in order to scan the next track properly, bi-morph leaf 2 may be supplied with a drive voltage of very high magnitude in order to displace the head into proper scanning alignment. A purpose of the present invention is to avoid overloading, or overdriving the bi-morph leaf because of such time errors in transporting tape 4.

Before describing the manner in which the time errors in transporting tape 4 are corrected, reference is made to another aspect shown in the apparatus of FIG. 1 whereby the operator is provided with an indication that he has commanded the movement of tape 4 by a distance equal to one track pitch. This indication is provided by a reaction wheel 21 mechanically coupled to jog wheel 16, and selectively braked by a solenoid-operated brake mechanism 39. Brake mechanism 39 includes a solenoid 38 driven by an amplifier 37 which, in turn, is supplied with a signal by an OR-gate 36. The OR-gate is coupled to receive carry pulse CA and borrow pulse BO. Thus, whenever 16 command clock pulses CK have been counted by counter 31 so as to result in the generation of a track shift pulse CA or BO, OR-gate 36 provides an output signal to amplifier 37. This output signal is amplified to energize solenoid 38 which, in turn, actuates brake mechanism 39. The brake mechanism tends to restrain the rotation of reaction wheel 21, which restraint is transferred to jog wheel 16 and is sensed by the operator as a detent. Thus, whenever tape 4 is commanded to move a distance equal to one track pitch, a momentary restraint of jog wheel 16 is sensed, thus apprising the operator that he has commanded this predetermined incremental movement.

Turning now to the correction of the aforementioned time errors, it will be appreciated that such errors are not uniform. That is, the time errors may vary from VTR to VTR and, moreover, may change as the VTR components age. Also, since the time errors are influenced by tape stretching, such errors may differ when a fresh tape is used than when an older tape is operated upon. Hence, the time errors are not easily predicted; and predictive compensation techniques are not preferred.

In accordance with the present invention, the time errors are detected by sensing or detecting the average shift of the "phase" of the pre-recorded track to be scanned relative to the commanded track or picture shift. If there are no time errors, then the rate at which the track-shift, or picture-shift, pulses are produced will be in synchronism with the rate at which tape 4 is transported. That is, the track-shift pulse rate will be equal to the rate at which the pre-recorded tracks actually are shifted by one track pitch. This means that the phase of the track which is being scanned and which is to be reproduced will exhibit a constant, fixed relationship with respect to the track-shift pulses. Time errors will be indicated by a change in this constant relationship. Hence, if the phase of the reproduced track changes with respect to the track-shift pulses, this change may be detected and fed back to the tape drive mechanism so as to adjust the movement of tape 4.

Figures 4A, 4B:
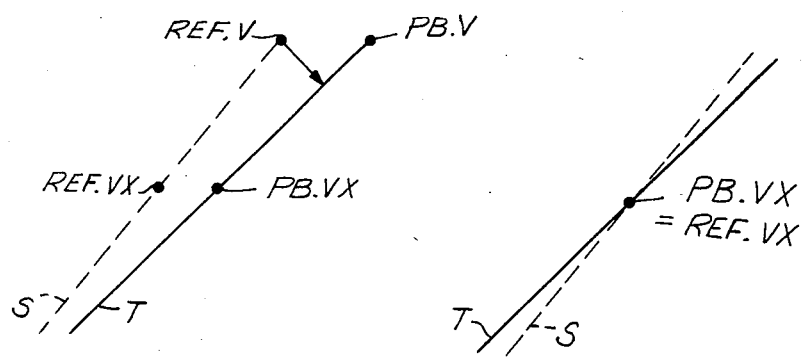
FIGS. 4A and 4B are diagrammatic representations of phase errors between a scanning trace and a pre-recorded track.

The actual position of the track being scanned by head 1 relative to the scanning trace of the head may be determined by sensing the phase difference between the reference vertical sync signal REF.V at the time that the head completes its trace and the vertical sync signal PB.V which is reproduced from the track being scanned. FIGS. 4A and 4B illustrate the relationship between the scanning trace S of head 1 and the track T which is scanned thereby. In FIG. 4A, it is seen that scanning trace S leads track T and, for proper tracking control, bi-morph leaf 2 must be deflected so as to displace the head into alignment with track T. In FIG. 4B, scanning trace S and track T are in phase with each other. From these illustrations, it will be recognized that the trace of head 1 is "in phase" with track T when the mid-point of the trace coincides with the mid-point of the track, as shown in FIG. 4B. If the mid-point of the trace leads the mid-point of the track, then the phase of the trace may be thought of as leading the phase of the track. Conversely, if the mid-point of the trace lags the mid-point of the track, then the phase of the trace may be thought of as lagging the phase of the track. For the in-phase relationship, the effective drive voltage applied to bi-morph leaf 2 (excluding the dithering voltage W) is substantially equal to zero at the mid-point of the scanning trace. That is, for the in-phase relationship, the mid-points of trace S and track T will be in substantial coincidence when the bi-morph leaf is unbiased.

It is preferable to detect the phase relationship between trace S and track T at their respective mid-points. This is because the actual slope, or inclination of trace S relative to track T is a function of the speed at which tape 4 moves. If the signals PB.V and REF.V are used to indicate the phase difference, errors might be introduced because of the fact that the actual phase difference between these signals is a function of the inclination of trace S which, as just mentioned, is a function of the speed of tape 4. Thus, for the same phase relationship between trace S and track T at two different tape speeds, the indication provided by sensing the phase difference between signals PB.V and REF.V would erroneously indicate two different phase relationships. This error is avoided when the phase difference between trace S and track T is determined at the mid-points (FIG. 4B) because such mid-points coincide for all in-phase relationships regardless of the actual speed of tape 4. The mid-point of track T can be obtained by delaying the reproduced vertical sync signal PB.V by an amount such that the delayed vertical sync signal appears to occur at the mid-point of the track. Thus, the mid-point of track T is represented by the signal PB.VX. The mid-point of trace S may be obtained by sensing when head 1 reaches the center of its trace or, alternatively, the mid-point can be obtained by delaying the reference vertical sync signal REF.V by an appropriate amount. The mid-point of trace S is represented by the signal REF.VX.

The phase difference between scanning trace S and the track T scanned by head 1 is produced by phase difference detector 42, shown in FIG. 1. This phase difference detector, which may be a conventional phase detector, is supplied with the respective signals PB.VX and REF.VX. Any phase difference between these signals is sensed to produce a phase differential signal. As one example, the signal REF.VX may be produced slightly in advance of the actual mid-point of trace S; and may be used to enable a counter (not shown) to count relatively high frequency pulses. The count of this counter is detected upon the occurrence of the signal PB.VX; and this count thus represents the phase difference between trace S and track T. For example, determined number of clock pulses CK has been counted in the reverse, or downward direction. The carry and borrow pulses represent the commanded movement of tape 4 equal to a distance of one track pitch. The movement commanded by such predetermined number of clock pulses CK is effective to bring the next successive track recorded on tape 4 into position for scanning by head 1. Hence, and as mentioned previously, the carry and borrow pulses CA and BO are referred to as track-shift or picture-shift pulses, and these pulses are produced whenever tape 4 has been commanded to move through a distance equal to one track pitch.

As also mentioned above, regardless of the relative location of a track with respect to the scanning trace of head 1 at the time that a still-motion mode of reproduction is initiated, when no movement of jog wheel 16 for a predetermined interval (e.g. 2 seconds) is sensed, counter 31 is preset to an intermediate count of, for example, 8. It will be seen below that this intermediate count minimizes the time needed to correct the speed of capstan motor 7 so as to compensate for time errors in the tape transport system. Thus, immediately following the sensing of the still-motion mode, the first track-shift (or picture-shift) pulse CA or BO is produced after 8 clock pulses CK have been counted. Thereafter, successive track-shift (or picture-shift) pulses are produced when 16 consecutive clock pulses have been countd.

It will be appreciated that a track-shift or picture-shift pulse is produced at the proper time even if the operator reverses the rotation of jog wheel 16 while counter 31 is at some middle count. For example, if the jog wheel is rotated in the forward direction by an amount sufficient to produce 13 clock pulses CK, the count of counter 31 will be incremented to this count of 13. Then, if the jog wheel is rotated in the reverse direction, the clock pulses CK generated in response to such reverse rotation are counted in the reverse direction by counter 31. When this count is reduced from a count of 13 to a count of zero, and then a further reverse clock pulse is counted, the counter generates borrow pulse BO as the track-shift (or picture-shift) pulse.

Let it be assumed that jog wheel 16 is rotated in the forward direction so as to command forward movement of tape 4. When the tape has been commanded to move a distance equal to one track pitch, the track-shift pulse CA produced by counter 31 sets flip-flop circuit 32 to be stored therein This flip-flop circuit is reset in response to the reproduced vertical sync pulse PB.V (or the reference vertical sync pulse REF.V) when head 1 completes its scan of a record track. As described above, at the completion of a scanning trace, head-jump pulse j (FIG. 3C) normally is produced to displace the head by one track pitch. Now, however, since the tape has been advanced by an amount sufficient to dispose the next track in position to be scanned by head 1, the head-jump, or fly-back, should be avoided. This is achieved by triggering monostable multivibrator 34 in response to the resetting of flip-flop circuit 32, thereby producing the head-jump cancel pulse j̄, shown in FIG. 3D. Variable resistor $VR_2$ is set so that the magnitude of head-jump cancel pulse j̄ is equal to head-jump pulse j. Consequently, the normal head-jump pulse j (FIG. 3C) which is produced at the completion of a scanning trace now is cancelled in adder circuit 29 by head-jump cancel pulse j̄. Accordingly, after the head completes its scan of, for example, track $T_2$, it is not returned to the beginning of that track but, rather, maintains its then-present position so as to be in alignment with the beginning of track $T_3$. Therefore, it is seen that when tape 4 is commanded to be moved a distance sufficient to bring the next track into position for scanning, the track-shift (or picture-shift) pulse CA is stored in flip-flop circuit 32 and is used, when the head completes its present scan, to trigger monostable multivibrator 34 so as to prevent the head-jump voltage $H_j$ from being produced. This, in turn, inhibits bi-morph leaf 2 from displacing head 1 by a track pitch which, if now carried out, would mis-align the head with respect to the next track to be scanned. Hence, during forward movement of tape 4, when the next track, or picture, is positioned for scanning by head 1, the head is controlled to scan this next track.

If jog wheel 16 is rotated in the reverse direction, the track-shift pulse BO is produced by counter 31 when tape 4 has been commanded to move in the reverse direction by a distance equal to one track pitch. This track-shift pulse is stored in flip-flop circuit 33 until head 1 completes its scan. At that time, the reproduced vertical sync signal PB.V (or the reference vertical sync signal REF.V) resets this flip-flop circuit so as to trigger monostable multivibrator 35. As shown in FIG. 3E, monostable multivibrator 35 generates the head-jump pulse j′ which is level-adjusted by variable resistor $VR_3$ so as to be substantially equal to the normal head-jump pulse j (FIG. 3C). Head-jump pulses j and j′ are added in adder circuit 29, resulting in a head-jump voltage $2H_j$ of twice the normal head-jump voltage. This head-jump voltage $2H_j$ is applied to bi-morph leaf 2 so as to deflect head 1 a distance equal to two track pitches, as shown in FIG. 2. Thus, when tape 4 is commanded to move in the reverse direction, after head 1 completes it scan of track $T_2$, the bi-morph leaf is driven so as to deflect the head by an amount sufficient to bring it into registration with the beginning of the next preceding track $T_1$.

From the foregoing description, it is appreciated that, when jog wheel 16 is rotated by an amount sufficient to generate 16 command clock pulses CK, counter 31 generates the track-shift pulse CA or BO, depending upon the direction of commanded tape movement, which, in turn, cancels or doubles the normal head-jump pulse j. Thus, when the tape has been commanded to move a distance equal to one track pitch in the forward direction, head 1 is not returned to the beginning of the last track scanned thereby but, instead, is maintained in its present position so as to scan the next-following track. Hence, the next picture is reproduced by the head in response to the track-shift pulse. Conversely, if the tape is commanded to move in the reverse direction by a distance equal to one track pitch, then, at the completion of its scanning trace, the head is deflected by a distance equal to two track pitches so as to bring it into proper scanning relationship with the next preceding track.

From the foregoing, it is seen that the track-shift pulse CA or BO which is used to shift the displacement of head 1 from one track to another, is generated as a function of the command pulses CK produced in response to the rotation of jog wheel 16. Although such command pulses are used by motor drive circuit 24 to drive capstan motor 7, it is appreciated that electrical and mechanical time constants, mechanical inertia and possible stretching of tape 4 may result in delays between a generated command clock pulse CK and the actual corresponding movement of tape 4 in response to that pulse. This means that head 1 may be controlled to scan the next track at a time when that next track possibly is out of scanning position. That is, since the track-shift control is relatively independent of tape movement, the scanning trace of the head may be shifted from one track to the next before the next track is sufficiently advanced into proper scanning position. Hence, in order to scan the next track properly, bi-morph leaf 2 may be supplied with a drive voltage of very high magnitude in order to displace the head into proper scanning alignment. A purpose of the present invention is to avoid overloading, or overdriving the bi-morph leaf because of such time errors in transporting tape 4.

Before describing the manner in which the time errors in transporting tape 4 are corrected, reference is made to another aspect shown in the apparatus of FIG. 1 whereby the operator is provided with an indication that he has commanded the movement of tape 4 by a distance equal to one track pitch. This indication is provided by a reaction wheel 21 mechanically coupled to jog wheel 16, and selectively braked by a solenoid-operated brake mechanism 39. Brake mechanism 39 includes a solenoid 38 driven by an amplifier 37 which, in turn, is supplied with a signal by an OR-gate 36. The OR-gate is coupled to receive carry pulse CA and borrow pulse BO. Thus, whenever 16 command clock pulses CK have been counted by counter 31 so as to result in the generation of a track shift pulse CA or BO, OR-gate 36 provides an output signal to amplifier 37. This output signal is amplified to energize solenoid 38 which, in turn, actuates brake mechanism 39. The brake mechanism tends to restrain the rotation of reaction wheel 21, which restraint is transferred to jog wheel 16 and is sensed by the operator as a detent. Thus, whenever tape 4 is commanded to move a distance equal to one track pitch, a momentary restraint of jog wheel 16 is sensed, thus apprising the operator that he has commanded this predetermined incremental movement.

Turning now to the correction of the aforementioned time errors, it will be appreciated that such errors are not uniform. That is, the time errors may vary from VTR to VTR and, moreover, may change as the VTR components age. Also, since the time errors are influenced by tape stretching, such errors may differ when a fresh tape is used than when an older tape is operated upon. Hence, the time errors are not easily predicted; and predictive compensation techniques are not preferred.

In accordance with the present invention, the time errors are detected by sensing or detecting the average shift of the "phase" of the pre-recorded track to be scanned relative to the commanded track or picture shift. If there are no time errors, then the rate at which the track-shift, or picture-shift, pulses are produced will be in synchronism with the rate at which tape 4 is transported. That is, the track-shift pulse rate will be equal to the rate at which the pre-recorded tracks actually are shifted by one track pitch. This means that the phase of the track which is being scanned and which is to be reproduced will exhibit a constant, fixed relationship with respect to the track-shift pulses. Time errors will be indicated by a change in this constant relationship. Hence, if the phase of the reproduced track changes with respect to the track-shift pulses, this change may be detected and fed back to the tape drive mechanism so as to adjust the movement of tape 4.

The actual position of the track being scanned by head 1 relative to the scanning trace of the head may be determined by sensing the phase difference between the reference vertical sync signal REF.V at the time that the head completes its trace and the vertical sync signal PB.V which is reproduced from the track being scanned. FIGS. 4A and 4B illustrate the relationship between the scanning trace S of head 1 and the track T which is scanned thereby. In FIG. 4A, it is seen that scanning trace S leads track T and, for proper tracking control, bi-morph leaf 2 must be deflected so as to displace the head into alignment with track T. In FIG. 4B, scanning trace S and track T are in phase with each other. From these illustrations, it will be recognized that the trace of head 1 is "in phase" with track T when the mid-point of the trace coincides with the mid-point of the track, as shown in FIG. 4B. If the mid-point of the trace leads the mid-point of the track, then the phase of the trace may be thought of as leading the phase of the track. Conversely, if the mid-point of the trace lags the mid-point of the track, then the phase of the trace may be thought of as lagging the phase of the track. For the in-phase relationship, the effective drive voltage applied to bi-morph leaf 2 (excluding the dithering voltage W) is substantially equal to zero at the mid-point of the scanning trace. That is, for the in-phase relationship, the mid-points of trace S and track T will be in substantial coincidence when the bi-morph leaf is unbiased.

It is preferable to detect the phase relationship between trace S and track T at their respective mid-points. This is because the actual slope, or inclination of trace S relative to track T is a function of the speed at which tape 4 moves. If the signals PB.V and REF.V are used to indicate the phase difference, errors might be introduced because of the fact that the actual phase difference between these signals is a function of the inclination of trace S which, as just mentioned, is a function of the speed of tape 4. Thus, for the same phase relationship between trace S and track T at two different tape speeds, the indication provided by sensing the phase difference between signals PB.V and REF.V would erroneously indicate two different phase relationships. This error is avoided when the phase difference between trace S and track T is determined at the mid-points (FIG. 4B) because such mid-points coincide for all in-phase relationships regardless of the actual speed of tape 4. The mid-point of track T can be obtained by delaying the reproduced vertical sync signal PB.V by an amount such that the delayed vertical sync signal appears to occur at the mid-point of the track. Thus, the mid-point of track T is represented by the signal PB.VX. The mid-point of trace S may be obtained by sensing when head 1 reaches the center of its trace or, alternatively, the mid-point can be obtained by delaying the reference vertical sync signal REF.V by an appropriate amount. The mid-point of trace S is represented by the signal REF.VX.

The phase difference between scanning trace S and the track T scanned by head 1 is produced by phase difference detector 42, shown in FIG. 1. This phase difference detector, which may be a conventional phase detector, is supplied with the respective signals PB.VX and REF.VX. Any phase difference between these signals is sensed to produce a phase differential signal. As one example, the signal REF.VX may be produced slightly in advance of the actual mid-point of trace S; and may be used to enable a counter (not shown) to count relatively high frequency pulses. The count of this counter is detected upon the occurrence of the signal PB.VX; and this count thus represents the phase difference between trace S and track T. For example, the frequency of the pulses counted by the counter, and the relative advance of signal REF.VX may be such that the counter attains a count of 32 when trace S and track T are in phase. Hence, a phase lead or a phase lag between trace S and track T may be represented by a count value in the range of 0 to 64.

Figure 5:
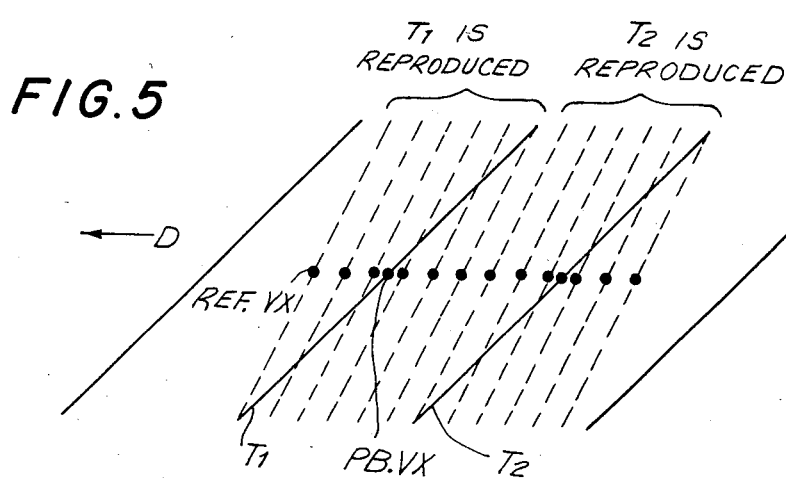
FIG. 5 is a diagrammatic representation of a plurality of scans of a particular pre-recorded track, which is useful in understanding the operation of the present invention.

Let is be assumed that tape 4 is advancing at 1/6 the normal reproducing speed (i. e. $n=1/6$). In this slow-motion mode, as represented in FIG. 5, head 1 scans six successive traces in the duration that tape 4 is advanced by one track pitch. Thus, consecutive traces are scanned by the head for every 1/6 track pitch advancement of the tape. After head 1 scans six traces, tape 4 is advanced by an amount, sufficient to dispose the next adjacent track in position for scanning. Thus, as shown in FIG. 5, the head scans six successive traces across track $T_1$ and then the usual head-jump (described above) is inhibited and the head next is positioned properly to scan track $T_2$. This track also is scanned six times, and the the next-following track is scanned, and so on. FIG. 5 also represents the phase difference between each scan (shown by the broken lines) and each track that is scanned by the head. These phase differences are represented by the dots corresponding to REF.VX and PB.VX, respectively. It is seen that the first three traces of the head across track $T_1$ lead the track by progressively decreasing phase differentials; and the next three traces of the head across the track lag the track by progressively increasing phase differentials. In transporting tape 4 at 1/6 normal speed, none of the traces of head 1 is precisely in phase with the track.

Figure 6:
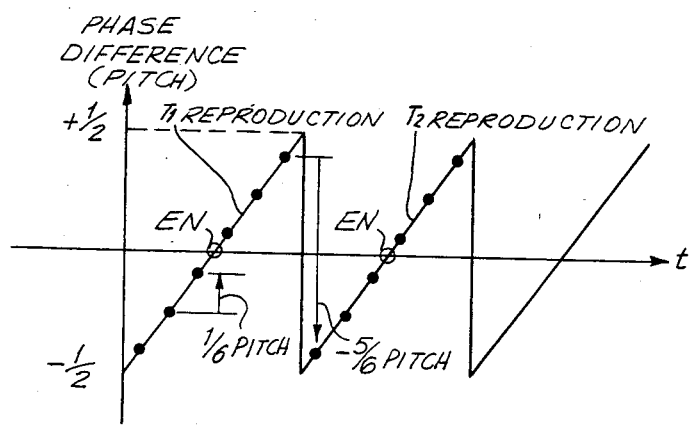
FIG. 6 is a graphical representation of the operation of the phase difference detector shown in FIG. 1.

FIG. 6 represents the phase difference between each scanning trace and the scanned track with respect to time. It is appreciated that the maximum phase differential is equal to $\pm\frac{1}{2}$ track pitch. The dots illustrated in FIG. 6 represent the phase differential obtained by detecting the phase difference between the signals REF.VX and PB.VX. When track $T_1$ or track $T_2$ is scanned successively, the phase differential between that track and successive scanning traces changes by 1/6 track pitch for every trace. Thus, and with respect to track $T_1$, for example, the first three traces are seen to lead the track, as represented by negative phase differences, and the next three traces are seen to lag the track, as represented by positive phase differences. At the completion of the sixth scan of track $T_1$, the tape will have been advanced sufficiently to dispose track $T_2$ in position for scanning. Hence, after the sixth scan of track $T_1$, the head-jump pulse is inhibited and the head now is enabled to scan track $T_2$. It is seen that the phase difference between the sixth trace of track $T_1$ and the first trace of track $T_2$ changes abruptly by 5/6 track pitch. That is, the phase difference between the trace of head 1 and the track scanned by the head undergoes a substantial swing from a maximum positive phase difference to a maximum negative phase difference, this swing being equal to 5/6 track pitch.

In general, when tape 4 is transported at n times normal speed, the phase difference from one scan of, for example, track $T_1$ to the next scan of this same track may be represented as $\Delta=(n-m)$ pitch, wherein m is an integer and $m<n<m+1$. When a track-jump is carried out, that is, when the head completes its last scan of track $T_1$ and commences the scanning of the next track, such as track $T_2$, then the phase difference which is produced by phase difference detector 42 across this track-jump is represented as $\Delta'=(n-m-1)$ pitch. As shown in FIGS. 5 and 6, when $n=1/6$, $m=0$; and the change $\Delta$ in the phase difference when the head scans one track and then next scans the same track is $\Delta=(1/6-0)=1/6$. The phase difference $\Delta'$ which obtains at the track jump is seen to be $\Delta'=(1/6-0-1)=-5/6$ pitch.

Phase difference detector 42 produces the phase difference signal represented by the dots shown in FIG. 6. Of course, the phase difference signal changes with respect to time because tape 4 is moving. The average phase difference for the six scans of, for example, track $T_1$ is indicative of the time error in the tape transport response to the command clock pulses CK. That is, the average phase difference represents the time error between the rate at which track shifts (or picture shifts) are commanded and the speed at which tape 4 is being transported. Since a track-shift pulse is produced each time that counter 31 is incremented (or decremented) by a count of 16, the average phase difference may be obtained by sampling phase difference detector 42 when counter 31 attains its mid-count of 8. Accordingly, as shown in FIG. 1, a decoder 43 is coupled to counter 31 to produce a sampling, or enabling, pulse EN when the count of counter 31 is detected as being equal to the count of 8. Thus, the phase difference signal produced by phase difference detector 42 in response to each scan of a track is sampled by the enabling pulse EN when the tape has been commanded to move a distance equal to $\frac{1}{2}$ the track pitch. In FIG. 6, the sampling of phase difference detector 42 is represented by the occurrence of the enable pulse EN which occurs when the tape has been commanded to move a distance equal to $\frac{1}{2}$ the track pitch. This enable pulse is shown by the open circle in FIG. 6. Of course, if the trace of head 1 is in proper phase relationship with respect to the track scanned thereby, thus indicating the absence of time errors in the tape transport response to the command pulses, the sampled phase difference will be substantially equal to zero, as represented by the open circles in FIG. 6. However, the time errors in the transporting of tape 4 are indicated by the magnitude of the phase difference signal which is sampled by the enable pulse EN. Such phase difference signals will not be equal to zero and, in the presence of time errors, the open circles shown in FIG. 6 will be above or below the axis, depending upon whether the phase of the track leads or lags the phase of the scanning trace. The sampled phase difference signal E is supplied to pulse correction circuit 23 in order to adjust the command pulses CK supplied as pulses CK' to motor drive circuit 24. This adjustment results in increasing or decreasing the speed of capstan motor 7 in a direction so as to reduce the sampled phase difference signal E to a null value.

FIG. 7A is a graphical representation of the characteristics of the phase difference signal E which is produced when tape 4 is transported at, for example, 0.9 times normal reproduction speed. FIG. 7B is a timing diagram representing the occurrence of the reproduced vertial sync signal PB.V (or the reference vertical sync signal REF.V); and FIG. 7C is a timing representation of the count of counter 31 as the tape is transported at 0.9 times normal speed. It is seen that the phase difference between the scanning of head 1 and the track scanned thereby changes from trace to trace. Furthermore, since the tape is transported at a speed which is almost equal to, but less than, normal speed, this phase difference also changes from one reproduced field to the next. Since the occurrence of the reproduced vertical sync signal PB.V is a function primarily of the scanning of the tape by head 1, the occurrence of such reproduced vertical sync signals generally is not in synchronism with the occurrence of the track-shift pulses CA or BO, the latter being a function of the operation of jog wheel 16. Accordingly, as illustrated in FIG. 7C, when the tape is transported at 0.9 times normal speed, no track-shift pulse will occur during some scans by the head. At the completion of the trace represented by the field interval shown in FIG. 7C, the track-shift pulse CA is not produced and, consequently, the head-jump cancel pulse j also is not produced. This means that, at the end of the scanning trace illustrated in FIG. 7C, the head jumps, or flies-back, to begin scanning the very same track which it had just scanned. This retracing of the same track is illustrated in FIG. 7A.

As also shown in FIG. 7A, when the head flies-back to re-scan the same track, the phase difference signal E sampled in phase difference detector 42 undergoes its maximum swing equal to 0.9 pitch. Prior to the re-scanning of the track, the phase difference signal E sampled by the enable pulse EN is at its maximum negative level, and following the re-scanning of the track, the phase difference signal E sampled by the enable pulse EN is at its maximum positive level. This results in the maximum swing of the sampled phase difference signal equal to 0.9 pitch.

Turning now to FIG. 8, there is illustrated a graphical representation of the phase difference signal produced by phase difference detector 42 when head 1 scans successive traces across tape 4 which moves at 0.05 times the normal reproduction speed. That portion of the graphical representation in the +t direction represents slow forward motion of the tape; and that portion of the graphical representation in the −t direction represents slow reverse motion of the tape. Track-shift pulses CA are generated by counter 31 when the tape has been commanded to move forward by a distance equal to one track pitch. As described above, the head-jump, or fly-back, of head 1 is inhibited in response to each track-shift pulse CA; and, consequently, the head is positioned so as to scan the next-following track recorded on tape 4. Likewise, track-shift pulses BO are produced when tape 4 has been commanded to move in the reverse direction by the distance equal to one track pitch. Here too, the head-jump, or fly-back, deflection of bi-morph leaf 2 is inhibited in response to the track-shift pulse BO so as to position head 1 to scan the next-preceding track on tape 4.

It is appreciated that the enable pulse EN is produced by decoder 43 when the tape has been commanded to move a distance equal to one-half the track pitch. That is, the enable pulse EN is produced when tape 4 has been commanded to move approximately half the distance before the next track-shift pulse CA (or BO) is generated. The phase difference signal E which is sampled by the enable pulse EN is seen to undergo a maximum swing equal to 1/20 pitch. This maximum swing is attributed primarily to the time errors in the transporting of tape 4. In the absence of such time errors, the phase difference signal E when sampled by enable pulse EN will be substantially equal to zero. Hence, the maximum swing of the sampled phase difference signal E in the presence of time errors is equal to 1/20 pitch when the tape is driven at 1/20 normal reproduction speed.

Figure 9:
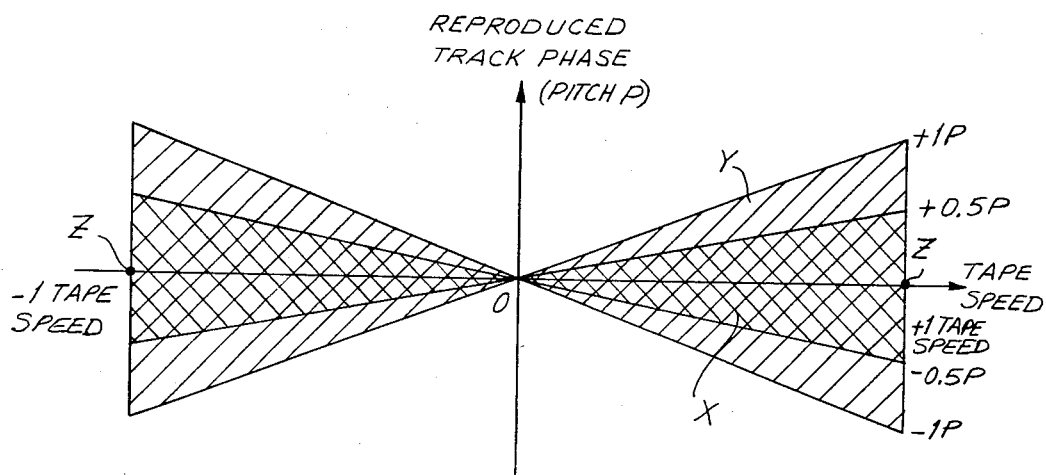
FIG. 9 is a graphical representation of the delimited range of error resulting from the present invention.

The range of the swing of phase difference signal E, sampled by the enable pulse EN, for different tape speeds is graphically represented in FIG. 9. Typically, the range of the swing of phase difference signal E falls within the cross-hatched area X having maximum and minimum levels of ±0.5 track pitch. It is recalled that this swing in the phase difference signal E is attributed primarily to time errors in the response of the tape transport system to the command clock pulses CK. If the tape transport system is highly responsive to the command pulses; or, alternatively, if pulse correction circuit 23 responds rapidly to the phase difference signal E supplied thereto in order to modify the command pulses CK' supplied to motor drive circuit 24, thus resulting in rapid correction of the aforementioned time errors, the range over which the phase difference signal E swings will be expanded to the range represented by the hatched area Y. This expansion in the range of the swing of phase difference signal E is due to the fact that a correction will be made even during normal head-jump, or fly-back, operations. For example, let it be assumed that, because of slip between tape 4 and the capstan/pinch roller combination, the phase of the reproduced track changes from zero to the range X (FIG. 9). That is, because of slip, the sampled phase difference signal E no longer is zero but, rather, now exhibits the illustrated swing. As a result, the sampled phase difference signal E is supplied to pulse correction circuit 23 for modifying the command clock pulses CK' so as to change the speed at which tape 4 is driven, thereby restoring the phase difference signal E to zero. However, this change, or adjustment, in the speed at which the tape is driven is carried out when the tape is advanced sufficiently to bring the next track into position for scanning, as well as when the tape has not been advanced by that distance. In the latter mode, the same track which had been scanned previously is rescanned by head 1. As shown in FIG. 7A, this re-scanning of the same track, which is attained by applying the head-jump voltage $H_j$ to bi-morph leaf 2, results in the maximum swing of the sampled phase difference signal E. Consequently, the range of the sampled phase difference signal is enlarged from the range X to the range Y. That is, the range X effectively "rotates" about the origin such that one edge of this graphically depicted range coincides with the horizontal axis, and the other, opposite edge of this range coincides with the outer limit of range Y (i.e. it coincides with the limit +1 pitch or −1 pitch). Because of this expansion in the range over which the phase difference signal E swings, it is not desirable for the tape transport system, and particularly, pulse correction circuit 23, motor drive circuit 24 and capstan motor 7, to exhibit high sensitivity and rapid response to changes in the detected, sampled phase difference signal E. Stated otherwise, rapid response and high sensitivity to changes in the phase difference signal may result in increasing the range over which the sampled phase difference signal swings.

A preferred embodiment of phase correction circuit 23 in accordance with the desirable features and advantages of the present invention is illustrated in the block diagram shown in FIG. 10. The pulse correction circuit is comprised of a low pass filter 44, a level detector 45, a switching circuit 46 and a pulse modulator 47. Low pass filter 44 is coupled to the output of phase difference detector 42 and is adapted to filter out the higher frequency components included in the sampled phase difference signal E. The low pass filter is illustrated as a conventional RC circuit for supplying the filtered error signal to level detector 45. It will be appreciated that the time constant of low pass filter 44 is sufficiently high so as to reduce the swing, or rate of swing, of phase difference signal E due to detected time errors in the transport of tape 4.

Level detector 45 is adapted to detect whether the level of the phase difference signal E is greater than or less than a predetermined level. The voltage characteristic of phase difference signal E is graphically illustrated in FIG. 11. As shown, if the phase of the track T scanned by head 1 leads the phase of the scanning trace S of the head, the polarity of the phase difference signal E produced by phase difference detector 42 is negative. Furthermore, the magnitude of the phase difference signal E increases linearly to the level $-2$ volts when the phase difference is equal to $+\frac{1}{4}$ pitch; and, thereafter, as the phase difference increases, the voltage magnitude of the phase difference signal remains substantially constant at $-2$ volts. Conversely, if the phase of the reproduced track T lags the phase of the scanning trace S, the polarity of the phase difference signal produced by phase difference detector 42 is positive. The voltage magnitude of this phase difference signal increases linearly to the level $+2$ volts when the phase lag is $-\frac{1}{4}$ pitch; and, thereafter, as the phase lag increases, the voltage magnitude of the phase difference signal remains substantially constant. Level detector 45 is adapted to detect if the polarity of the phase difference signal E is positive or negative. If desired, a so-called "dead zone" may be provided, wherein level detector 45 operates to detect if the phase difference signal E exceeds this dead zone.

The level detector operates to produce a positive output voltage at its output terminal designated ADD when the polarity of the filtered phase difference signal E is positive. Conversely, the level detector provides a positive voltage level at its output designated SUB when the polarity of the filtered phase difference signal is negative. The positive voltage at the ADD terminal is referred to herein as the ADD signal and is represented as a binary "1". The positive voltage at the SUB terminal is referred to as the SUB signal and is represented as a binary "1". In the preferred embodiment, the ADD and SUB signals are mutually exclusive such that when ADD="1", SUB="0"; and when SUB="1", ADD="0". It will be appreciated that, when tape 4 is transported in the forward direction, the speed at which the tape is driven is increased when ADD="1", and the tape speed is decreased when SUB="1". When the tape is transported in the reverse direction, its speed is increased when SUB="1" and is decreased when ADD="1".

Switching circuit 46 is coupled to the ADD and SUB terminals of level detector 45 and is responsive to the direction control signal F/R to apply the ADD and SUB signals, respectively, to pulse modulator 47. The purpose of switching circuit 46 is to apply the proper ADD and SUB signals to the pulse modulator regardless of the direction in which tape 4 is driven. For example, if the phase of the reproduced track lags the phase of the scanning trace when tape 4 is transported in the forward direction, the switching circuit supplies the ADD="1" signal to pulse modulator 47 so as to increase the speed at which the tape is driven. If the tape is driven in the reverse direction and phase difference detector 42 detects the phase of the scanned track lagging the phase of the scanning trace, level detector 45 will provide the SUB="1" signal because of this reverse direction. However, switching circuit 46 will be controlled by the direction control signal to change over so as to supply the SUB="1" signal to pulse modulator 47 in a manner which will result in an increase in the speed at which the tape is reversely driven. That is, for the reverse direction, the effect of the ADD and SUB signals is interchanged. For this purpose, switching circuit 46 is illustrated as a double pole, double throw switch.

Pulse modulator 47 is responsive to the ADD and SUB signals supplied thereto to modulate the command clock pulses CK generated by detector 22. More particularly, one additional pulse is inserted into the command clock pulse train every 16 clock pulses in response to the ADD="1" signal; and one command clock pulse is deleted from that pulse train every 16 clock pulses in response to the SUB="1" signal. Thus, for tape that is commanded to move a distance equal to one track pitch, one command clock pulse is either inserted or deleted. The modified clock pulses are identified by the reference numeral CK'.

A logic diagram of pulse modulator 47 is illustrated in FIG. 12. This Figure illustrates a pulse insertion circuit, comprised of a D-type flip-flop circuit 48, a delay circuit 49, a pulse generator 50 and an OR gate 51; and a pulse deletion circuit comprised of another D-type flip-flop circuit 55, another pulse generator 56 and an AND gate 52. FIG. 12 also is provided with a reset circuit comprised of a counter 53, which preferably is a 16-step counter, and a still further pulse generator 54.

D-type flip-flop circuit 48 may be of conventional construction and is adapted to store a binary signal supplied to its D input in response to, for example, the negative (or positive) edge of a pulse applied to its T input. The logic state of the signal stored therein is represented at the Q output of the flip-flop circuit. The stored signal is reset in response to a signal applied to the reset input R of the flip-flop circuit. As illustrated in FIG. 12, the ADD signal is supplied to the D input of flip-flop circuit 48, and the T input thereof is supplied with command clock pulses CK. The Q output of the flip-flop circuit is coupled via delay circuit 49 to pulse generator 50. The delay circuit is adapted to provide a suitable delay equal to, for example, no less than the duration of a command clock pulse. The delayed output from flip-flop circuit 48 serves to trigger pulse generator 50 which, for example, may be a monostable multivibrator. The pulse produced by pulse generator 50 is referred to as the addition clock pulse $CK_{add}$; and this pulse is supplied to AND gate 52 via OR gate 51. This OR gate includes another input coupled to receive the command clock pulses CK.

The D input of flip-flop circuit 55 is coupled to receive the SUB signal; and the T input thereof is coupled in common with the T input of flip-flop circuit 48 to receive the command clock pulse CK. In the illustrated embodiment, flip-flop circuit 48 is triggered by, for example, the negative edge, or transition, of the command clock pulse; whereas flip-flop circuit 55 is triggered by the positive edge, or transition of this pulse. The Q output of flip-flop circuit 55 is coupled to pulse generator 56 and serves to trigger this pulse generator to produce the illustrated negative-going subtracting clock pulse $CK_{sub}$. Pulse generator 56 may comprise a monostable multivibrator to produce the subtracting clock pulse $CK_{sub}$ of a duration which is substantially equal to the pulse duration of a command clock pulse CK. The subtracting clock pulse $CK_{sub}$ is coupled to another input of AND gate 52 and serves to inhibit this AND gate for the duration of the subtracting clock pulse $CK_{sub}$. The output of AND gate 52 constitutes the modified, or adjusted, clock pulses CK'.

Counter 53 also is coupled to receive command clock pulses CK and is adapted to produce an output trigger signal when 16 consecutive command clock pulses have been counted. The output of counter 53 is coupled to pulse generator 54, which may comprise a monostable multivibrator, thus triggering the pulse generator to supply reset pulses to flip-flop circuits 48 and 55.

Let it be assumed that tape 4 is transported in the forward direction and, moreover, that phase difference detector 42 detects that the phase of the track T scanned by head 1 lags the phase of the trace S of this head. Consequently, the ADD="1" signal is derived from phase difference signal E. It is recalled that the phase difference signal is produced by sampling phase difference detector 42 by the enable pulse EN when tape 4 has been commanded to move a distance equal to ½ of the track pitch.

At the next command clock pulse CK, flip-flop circuit 48 is set by the ADD="1" signal, whereupon the Q output of this flip-flop circuit is provided with a positive transition, as illustrated in FIG. 12. After a suitable delay imparted by delay circuit 49, the delayed transition triggers pulse generator 50 to produce the illustrated addition pulse $CK_{add}$. This addition pulse, which is produced after the aforementioned command clock pulse CK, passes through OR gate 51 and is inserted into the command clock pulse train by AND gate 52, thus adjusting, or modulating, command clock pulse train CK'. It will be appreciated that AND gate 52 normally is enabled to pass the addition clock pulse $CK_{add}$ because pulse generator 56 normally produces an output of relatively higher voltage level.

After tape 4 has been commanded to move a distance equal to one track pitch, 16 consecutive command clock pulses CK will have been counted by counter 53. Upon counting the 16th command clock pulse, counter 53 triggers pulse generator 54 to reset flip-flop circuit 48. The pulse insertion circuit thus is conditioned to respond to the next ADD="1" signal to insert another clock pulse into the command clock pulse train.

If phase difference detector 42 detects that the phase of track T leads the phase of the trace S when tape 4 is transported in the forward direction, the SUB="1" signal is produced. Upon the occurrence of the next command clock pulse CK, flip-flop circuit 55 is set. The Q output of this flip-flop circuit is provided with a positive transition which triggers pulse generator 56 to generate the illustrated subtracting clock pulse $CK_{sub}$. Accordingly, the output of pulse generator 56 falls from its normally higher level so as to form the illustrated negative-going pulse whose duration is substantially equal to the duration of a command clock pulse CK. AND gate 52 is disabled for the duration of this subtracting clock pulse $CK_{sub}$ and, therefore, does not pass the command clock pulse CK which is supplied thereto by OR gate 51. Consequently, one of the command clock pulses is deleted from the command clock pulse train CK'.

After tape 4 has been commanded to advance a distance equal to one track pitch, counter 53 attains a count of sixteen to trigger pulse generator 54. Consequently, flip-flop circuit 55 is reset so as to be conditioned to respond to the next SUB="1" signal.

From the foregoing description, it will be seen that one pulse is either inserted or deleted from the command clock pulse train for every sixteen pulses included in that train. Since the adjusted command clock pulses CK' are supplied to motor drive circuit 24 to determine the speed at which capstan motor 7 is driven, an insertion or deletion of one command clock pulse every sixteen pulses results in a speed adjustment on the order of 1/16, which is equal to an adjustment of about 6% of the motor speed. Thus, time errors in the movement of tape 4 are corrected such that the next track is disposed in position to be scanned by head 1 at the same time that the track-shift pulse CA (or BO) is generated.

It will be seen that the movement of tape 4 is controlled even in extremely slow forward and reverse speeds. Consequently, the video picture which is reproduced from the pre-recorded tracks on this slow-moving tape exhibits minimal noise and is highly stable and accurate. The phase difference between the scanned track and the scanning trace of head 1 is constrained within a relatively small range; and the adjustment of the tape speed is carried out smoothly.

The effective gain of the tape speed correction system is a function of the amount of tape which should be transported in response to each command clock pulse CK. This, in turn, is a function of the inertia of the tape transport system as well as expected tape stretching, time constants of the electronics, and so on. If the time errors to be corrected are relatively small, then the pulse modulator illustrated in FIG. 12 may operate to insert or delete one clock pulse for every 32, command clock pulses. In that event, counter 53 may be replaced by a 32-step counter. Alternatively, if the time errors to be corrected are relatively large, one clock pulse may be inserted or deleted for every eight command clock pulses. In that event, counter 53 may be replaced by an 8-step counter.

FIGS. 13A and 13B graphically represent the effect of the aforedescribed adjustments to the speed at which tape 4 is transported. As an example, it is assumed that tape 4 is transported at 1/20 times the normal reproduction speed. FIG. 13A represents that the phase of the track T scanned by head 1 leads the phase of each trace S. Hence, the phase difference signal E sampled by enable pulse EN is seen to be positive. However, by deleting one command clock pulse for every track scanned by the head, that is, by deleting one command clock pulse for every sixteen clock pulses, the speed at which tape 4 is driven is reduced. This reduction in speed, which is on the order of about 6%, tends to retard the phase of the scanned tracks to bring the phase of the tracks into coincidence with the phase of the scanning traces. Consequently, the sampled phase difference signal E is reduced to a null value in the vicinity of the zero axis of FIG. 13A.

Conversely, and as illustrated in FIG. 13B, if the phase of the reproduced tracks T lags the phase of the scanning traces S, the phase difference signal sampled by enable pulse EN will exhibit negative polarity. As a result of the phase difference signal E produced by phase difference detector 42, the ADD="1" signal is supplied to pulse correction circuit 23, thereby increasing the speed at which tape 4 is advanced. This increase in the speed of the tape tends to advance the phase of the reproduced tracks T, thus reducing the phase difference signal E to a null value. As shown in FIGS. 13B, the sampled phase difference signal approaches the zero axis.

In both the speed-reducing and speed-increasing modes of correction, the rate at which tape speed is adjusted is on the order of about 6%. Thus, the proper track to be scanned is disposed in position for accurate scanning by head 1 with minimal overall deflection by bi-morph leaf 2. That is, the speed at which the tape is transported is brought into closer synchronism with the rate at which track-shift pulses CA (or BO) are generated. Hence, the overall range of the swing of the sampled phase difference signal is constrained within the limits X shown in FIG. 9. This means that bi-morph leaf 2 is not overloaded.

FIG. 14 is another graphical representation of the manner in which tape 4 is adjusted to bring the tracks recorded thereon into phase with the track-shift signal CA (or BO). Here, the broken curve represents tape movement and the solid, stepped curve represents the track or picture shift. In region I, tape 4 is maintained stationary, and the still-motion reproduction mode is carried out. In region II, the tape is advanced to search for a desired picture, or track. It is seen that the phase of the tracks T lags the phase of the traces S during this search mode in region II.

FIG. 14 illustrates a transition between regions II and III. In this transition, tape 4 is stopped for a brief period of time. Furthermore, prior to stopping the tape, it is seen that a reverse motion is commanded. Hence, in the transition between regions II and III, the phase of the tracks is seen to lead the phase of the traces. Region III represents the slow-motion reproduction mode wherein tape 4 is advanced at ¼ times its normal reproducing speed. The phase of the scanned tracks is seen to be brought into correspondence with the phase of the scanning traces. At region IV, the tape is stopped briefly to carry out the still-motion reproduction mode. Then, at region V, the tape is advanced once again, and now is driven at ½ its normal reproduction speed. FIG. 14 provides a good graphical representation of the time errors in the response of the tape transport system to transport command pulses; and also indicates the correction, or compensation, of these time errors.

In the aforedescribed embodiment, the time errors in the transport of tape 4 are detected by comparing the phase at the mid-point of a scanned track with the phase at the mid-point of a scanning trace. Alternatively, the relative phase lead or phase lag of the reproduced tracks may be determined by sensing the usual control signal CTL, normally recorded along the longitudinal edge of the tape, and phase comparing the detected control signal with the phase of the rotary head. That is, the phase difference between the control signal and a head-position pulse, the latter being produced when the head rotates to a predetermined rotary location, may be used to determine the phase lag or phase lead of the scanned tracks. Here too, even when the control signal is used to represent the relative phase of the reproduced track, the enable pulse EN should be used to sample the phase-detected signal. Rather than count the command clock pulses CK to produce the enable pulse EN, the enable pulse may be produced when the bi-morph leaf drive voltage exhibits an average value, or when the deflection of the bi-morph leaf is, for example, one-half the maximum deflection swing thereof during a scanning trace.

The number of command clock pulses CK which are generated to advance the tape a distance equal to one track pitch may be a function of the expected time errors. That is, for large time errors requiring large corrections, the tape may be commanded to move a relatively larger distance in response to each command clock pulse. In the foregoing examples, it has been assumed that each command clock pulse is effective to command the tape to move a distance equal to 1/16 track pitch. Alternatively, for coarser corrections, each command clock pulse may command the movement of the tape through a distance equal to about ¼ track pitch. However, most tape drive systems do not require such a large correction. Also, pulse correction circuit 23 may be of the type which applies a correcting voltage magnitude to motor drive circuit 24 in response to the detected phase error between each reproduced track and the scanning traces across that track.

Figure 15:
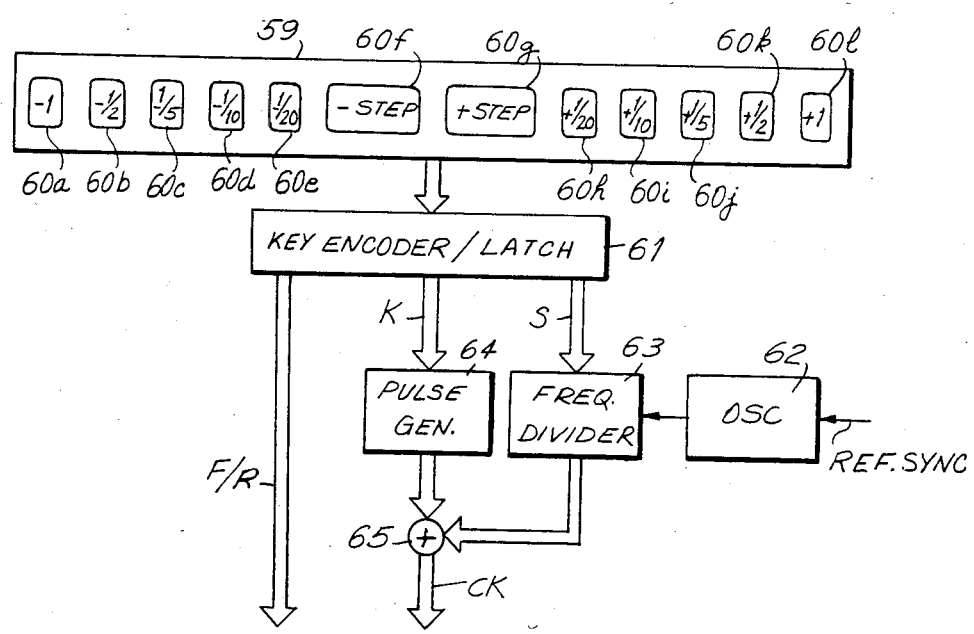
FIG. 15 is a block diagram of another embodiment of a tape movement command generator.

In the FIG. 1 embodiment, tape movement is commanded by manually operable jog wheel 16. An alternative embodiment of a command clock pulse generator is illustrated in FIG. 15. In this embodiment, a keyboard 59 is provided with a plurality of individually selectable switches 60a . . . 60l for selecting the desired speed and direction at which tape 4 may be transported. In addition, selector switches 60f and 60g are adapted, when actuated, to command the movement of tape 4 by a distance equal to one track pitch. For example, switches 60a–60e are adapted to command reverse movement of the tape at the normal reproduction speed, ½ normal speed, 1/5 normal speed, 1/10 normal speed and 1/20 normal speed, respectively. Switches 60h–60l are adapted to command forward movement of the tape at 1/20 normal speed, 1/10 normal speed, 1/5 normal speed, ½ normal speed and normal speed, respectively.

Keyboard 59 is coupled to an encoder/latch circuit 61 which may be of conventional construction. Depending upon the particular keyboard switch which is actuated, encoder/latch circuit 61 is adapted to produce the direction control signal F/R, as well as a frequency dividing signal S. In the event that step switches 60f or 60g are actuated, encoder/latch circuit 61 is adapted to produce a step signal K. The frequency dividing signal S is supplied to a programmable frequency divider 63, which may be of known type, to establish, or set, a frequency-dividing ratio therein determined by the signal S. An oscillator 62 is triggered by a reference synchronizing signal so as to produce pulses of a relatively higher frequency in synchronism with the reference synchronizing signal. The pulse frequency is divided by the dividing ratio determined by frequency dividing signal S. Hence, the output of programmable frequency divider 63 comprises the command clock pulse train CK having a pulse repetition rate determined by the frequency dividing signal S.

The step signal K is applied to a pulse generator 64 and is adapted to trigger the pulse generator such that a predetermined number of command clock pulses CK are generated thereby. In the aforedescribed example, pulse generator 64 is adapted to generate sixteen consecutive command clock pulses CK when triggered by step signal K. The predetermined number of command clock pulses generated by the pulse generator, as well as the command clock pulse train produced by frequency divider 63 are supplied, via a combining circuit 65, such as an adder circuit, as the command clock pulses CK. It will be seen that step signal K and frequency dividing signal S are mutually exclusive. Hence, either the frequency-divided command clock pulse train or the predetermined number of command clock pulses are supplied as the output command clock pulses CK.

The direction control signal F/R produced by encoder/latch circuit 61, as well as the command clock pulses CK, produced either by frequency divider 63 or pulse generator 64, are supplied to pulse correction circuit 23 and to counter 31 of FIG. 1 whereat they are used in the manner discussed in detail hereinabove.

When the embodiment shown in FIG. 15 is used to generate the command clock pulses CK, counter 31 is incremented or decremented in synchronism with the reference synchronising signal. Hence, the swing of the phase difference signal E becomes relatively smaller. Even when tape 4 is transported in the forward or reverse direction at its normal reproduction speed, the swing of the phase difference signal E may be constrained to the point Z shown in FIG. 9.

While the present invention has been particularly shown and described with reference to certain preferred embodiments, it will be readily apparent to those of ordinary skill in the art that various changes and modifications in form and details may be made without departing from the spirit and scope of the invention. It is intended that the appended claims be interpreted as including such changes and modifications.

What is claimed is:

1. A method of controlling the movement of a record medium having record tracks therein which are scanned by a transducer, said tracks being skewed relative to the direction in which said record medium is moved and said transducer being driven to scan traces generally disposed at an angle to said tracks, said method comprising the steps of commanding said record medium to be transported; detecting the phase differences between a record track being scanned and the trace of said transducer when said record medium has been commanded to be transported by a predetermined incremental amount; transporting said record medium in response to said command; deflecting said transducer in a direction generally transverse with respect to said track being scanned and by an amount which depends in part on the position of said transducer along the length of said track being scanned, whereby said angle is minimized; and adjusting the speed at which said record medium is transported as a function of said detected phase difference.

2. The method of claim 1 wherein said step of commanding said record medium to be transported comprises generating command pulses, each commanding a predetermined incremental movement of said record medium; and wherein said step of transporting comprises moving said record medium at a speed that is a function of the frequency of said generated command pulses and by an amount that is a function of the number of command pulses which are generated.

3. The method of claim 2 wherein actual movement of said record medium is asynchronous with said generated command pulses.

4. The method of claim 2 wherein said step of adjusting the speed at which said record medium is transported comprises selectively inserting pulses to said command pulses when said record track being scanned is detected as lagging said trace of said transducer so as to increase said speed of transport as a function of the inserted pulses; and selectively deleting pulses from said command pulses when said record track being scanned is detected as leading said trace of said transducer so as to decrease said speed of transport as a function of the deleted pulses.

5. The method of claim 2 wherein said step of detecting the phase difference between a record track being scanned and the trace of said transducer comprises sensing the phase difference between the substantial mid-points of said record track being scanned and each said trace of said transducer; and sampling said sensed phase difference when said record medium has been commanded to be transported by said predetermined incremental amount.

6. The method of claim 5 wherein said sampling comprises counting said generated command pulses, and sampling said sensed phase difference when a predetermined count of command pulses is attained.

7. The method of claim 6 wherein said predetermined count is approximately one-half the count of command pulses that are generated to transport said record medium by a distance equal to the pitch of said record tracks.

8. The method of claim 7 wherein said record medium is transported non-uniformly in response to said command pulses.

9. A method of controlling the movement of a video tape having skewed record tracks recorded thereon which are scanned by a playback head to carry out playback operations at different playback speeds in different playback modes wherein successive traces of said head are at an angle to said tracks as a function of said playback speed and playback mode, comprising the steps of generating command pulses, each commanding incremental movement of said tape at a speed which is a function of the rate at which said command pulses are generated; counting said command pulses to shift the track being scanned by said head when a predetermined number of command pulses is counted; deflecting said head in a direction generally transverse with respect to said track being scanned and by an amount which depends in part on the position of said head along the length of said track being scanned, whereby said angle is minimized notwithstanding the playback speed and playback mode; transporting said tape as a function of said command pulses so that said tape is nonuniformly driven by a predetermined incremental distance in response to each command pulse; sensing the phase difference between a track being scanned and the scanning trace of said head due to the nonuniform driving of said tape; and adjusting the speed at which said tape is driven as a function of the sensed phase difference.

10. The method of claim 9 wherein said step of sensing the phase difference comprises detecting the substantial mid-point of said track and each trace; detecting the phase difference between said detected mid-point; and sampling said detected phase difference when a count of command pulses substantially equal to commanded movement of one-half the pitch between tracks is obtained.

11. The method of claim 10 wherein said step of adjusting the speed at which said tape is driven comprises adding a command pulse when the sampled phase difference represents that the mid-point of said track lags the mid-point of said trace, and deleting a command pulse when the sampled phase difference represents that the mid-point of said track leads the mid-point of said trace.

12. The method of claim 11 wherein said step of adding a command pulse comprises adding a single command pulse during the interval that said tape is commanded to move by one full pitch; and said step of deleting a command pulse comprises deleting a single command pulse during the interval that said tape is commanded to move by one full pitch.

13. Apparatus for controlling the movement of a record medium having successive skewed tracks recorded thereon, which tracks are scanned by a movable transducer, comprising command means for generating a command signal to command movement of said record medium at a conmanded speed; transport means responsive to said command signal to transport said record medium; phase detecting means for detecting the relative phase difference between a scanned track and a trace scanned by said transducer, said phase difference being a function, at least in part, of errors in the response of said transport means to said command signal; deflecting means for deflecting said transducer in a direction generally transverse with respect to said scanned track and by an amount which depends in part on the position of said transducer along the length of said scanned track to make each of said traces substantially parallel to said tracks; and speed adjustment means responsive to the detected phase difference for adjusting said transport means to reduce said detected phase difference.

14. The apparatus of claim 13 wherein said phase detecting means comprises phase difference means for sensing the phase difference between a scanned track and each trace of said transducer as said trandducer scans said track; and sampling means for sampling the sensed phase difference when said record medium has been commanded to move a predetermined distance.

15. The apparatus of claim 14 wherein said predetermined distance is substantially equal to one-half the pitch of said successive tracks.

16. The apparatus of claim 14 wherein said command means comprises command pulse generating means for generating command pulses at an arbitrary rate, each command pulse commanding a predetermined incremental movement of said record medium; and wherein said sampling means comprises counting means for counting said command pulses to produce a sampling signal when a predetermined number of command pulses is counted.

17. The apparatus of claim 16 further comprising control means for causing said deflecting means to deflect said transducer by an amount sufficient to scan another track when a preselected number of command pulses is generated.

18. The apparatus of claim 17 wherein said preselected number represents a commanded movement substantially equal to the track pitch.

19. The apparatus of claim 16 wherein said command pulse generating means comprises manually operable bi-directional rotating means; disc means coupled to and rotatable with said bi-directional rotating means; and detecting means for sensing incremental rotation of said disc means to produce a command pulse when said disc means rotates a predetermined angular amount.

20. The apparatus of claim 19 wherein said bi-directional rotating means comprises a jog wheel to command movement of said record medium at a speed determined by the speed of rotation of said jog wheel, in a direction determined by the direction of rotation of said jog wheel, and by an amount determined by the angle through which said jog wheel is rotated.

21. The apparatus of claim 20, further including brake means for imparting temporary restraint to the rotation of said jog wheel when said counting means counts a preselected number of said command pulses.

22. The apparatus of claim 21 wherein said preselected number is substantially equal to the number of command pulses which command movement of said record medium by an amount coresponding to the track pitch.

23. The apparatus of claim 16 wherein said command pulse generating means comprises a plurality of manually operable switch means for selecting respective transport speeds of said record medium; a source of pulses at a predetermined pulse rate; and pulse rate dividing means responsive to the operation of said switch means for dividing the pulse rate of said pulses by a respective amount to produce said command pulses.

24. The apparatus of claim 23 wherein said command pulse generating means further includes step switch means operable to generate a preselected number of pulses.

25. The apparatus of claim 24 wherein said preselected number is substantially equal to the number of command pulses which command movement of said record medium by an amount corresponding to the track pitch.

26. The apparatus of claim 13 wherein said phase detecting means comprises means for providing a first signal representing the substantial mid-point of the track which is scanned by said transducer; means for providing a second signal representing the substantial mid-point of a trace scanned by said transducer; and phase difference means for producing a phase difference signal representing the phase difference between said first and second signals.

27. The apparatus of claim 26 wherein said phase difference signal exhibits a first condition when said first signal lags said second signal and a second condition when said first signal leads said second signal; and wherein said speed adjustment means is operative to increase the speed of said record medium in response to said first condition of said phase difference signal and to decrease the speed of said record medium in response to said second condition of said phase difference signal.

28. The apparatus of claim 27 wherein said command means comprises command pulse generating means for generating command pulses, each commanding a predetermined incremental movement of said record medium and a preselected number of command pulses commanding movement substantially equal to the pitch of said tracks; said transport means comprising pulsed motor drive means coupled to said command pulse generating means for driving said record medium in response to said command pulses applied thereto; and said speed adjustment means comprises pulse insert means for inserting pulses into the command pulses applied to said pulsed motor drive means when said phase difference signal exhibits said first condition and pulse deletion means for deleting pulses from the command pulses applied to said pulsed motor drive means when said phase difference signal exhibits said second condition.

29. The apparatus of claim 28 wherein said pulse insertion means inserts one pulse and said pulse deletion means deletes one pulse for every preselected number of command pulses.

30. The apparatus of claim 29 wherein said pulse insertion means comprises first storage means for storing said phase difference signal of said first condition, delay means for delaying indication of the stored phase difference signal and pulse generating means for generating an insert pulse in response to said delayed indication; wherein said pulse deletion means comprises second storage means for storing said phase difference signal of said second condition, pulse generating means for generating a delete pulse in response to the stored phase difference signal of said second condition and cancellation means responsive to said delete pulse to cancel a command pulse; and further including reset means for resetting said first and second storage means in response to said preselected number of command pulses and thereby enable said first and second storage means to store subsequent phase difference signals.

31. The apparatus of claim 13 wherein said record medium is a video tape, said successive tracks have video signals recorded therein, and said transducer includes a playback head for reproducing said video signals.

32. The apparatus of claim 31 wherein the recorded video signals include vertical synchronizing signals; and said phase detecting means comprises means for producing a reference signal when said transducer reaches a predetermined location in its trace, means for deriving a playback signal from the reproduced vertical synchronizing signals representing a predetermined location of a scanned track, and phase difference means for producing a phase difference signal representing the phase difference between said reference and playback signals.

* * * * *